(12) United States Patent  
Liang et al.

(10) Patent No.: US 11,681,746 B2  
(45) Date of Patent: Jun. 20, 2023

(54) STRUCTURED PREDICTION CROSSWALK GENERATION

(71) Applicant: UATC, LLC, San Francisco, CA (US)

(72) Inventors: Justin Jin-Wei Liang, Toronto (CA); Raquel Urtasun Sotil, Toronto (CA)

(73) Assignee: UATC, LLC, San Francisco, CA (US)

( * ) Notice: Subject to any disclaimer, the term of this patent is extended or adjusted under 35 U.S.C. 154(b) by 22 days.

(21) Appl. No.: 17/444,506

(22) Filed: Aug. 5, 2021

(65) Prior Publication Data

US 2021/0374437 A1     Dec. 2, 2021

Related U.S. Application Data

(63) Continuation of application No. 16/353,871, filed on Mar. 14, 2019, now abandoned.

(Continued)

(51) Int. Cl.
| | | |
|---|---|---|
| *G06F 16/58* | (2019.01) |
| *G06F 16/587* | (2019.01) |
| *G06T 7/70* | (2017.01) |
| *G06F 16/29* | (2019.01) |
| *G06V 20/56* | (2022.01) |

(Continued)

(52) U.S. Cl.
CPC ............ *G06F 16/587* (2019.01); *G06F 16/29* (2019.01); *G06T 7/70* (2017.01); *G06V 10/764* (2022.01); *G06V 10/82* (2022.01); *G06V 20/588* (2022.01); *G06T 2207/30256* (2013.01)

(58) Field of Classification Search
CPC .... G06V 20/588; G06V 10/764; G06V 10/82; G06F 16/29; G06F 16/55; G06F 16/909; G06F 16/587; G06T 7/70; G06T 2207/30256; G06T 2207/10024; G06T 2207/10028; G06T 2207/10032;

(Continued)

(56) References Cited

U.S. PATENT DOCUMENTS

| | | | |
|---|---|---|---|
| 10,509,971 B2 * | 12/2019 | Kaneko | ................. G06T 1/0007 |
| 2012/0177250 A1 * | 7/2012 | Nakano | ................ G06V 20/588 |
| | | | 382/103 |

(Continued)

OTHER PUBLICATIONS

"U.S. Appl. No. 16/353,871, Non Final Office Action dated May 5, 2021", 12 pgs.

(Continued)

*Primary Examiner* — Md K Talukder  
(74) *Attorney, Agent, or Firm* — Schwegman, Lundberg & Woessner, P.A.

(57) ABSTRACT

A method includes receiving image data associated with an image of a roadway including a crosswalk, generating a plurality of different characteristics of the image based on the image data, determining a position of the crosswalk on the roadway based on the plurality of different characteristics, the position including a first boundary and a second boundary of the crosswalk in the roadway, and providing map data associated with a map of the roadway, the map data including the position of the crosswalk on the roadway in the map. The plurality of different characteristics include a classification of one or more elements of the image, a segmentation of the one or more elements of the image, and one or more angles of the one or more elements of the image with respect to a line in the roadway.

20 Claims, 17 Drawing Sheets

Related U.S. Application Data

(60) Provisional application No. 62/642,835, filed on Mar. 14, 2018.

(51) Int. Cl.
  *G06V 10/764* (2022.01)
  *G06V 10/82* (2022.01)

(58) Field of Classification Search
  CPC . G06T 2207/20081; G06T 2207/20084; G06T 2207/30184; G06T 7/73
  See application file for complete search history.

(56) References Cited

U.S. PATENT DOCUMENTS

| | | | | |
|---|---|---|---|---|
| 2013/0321401 | A1* | 12/2013 | Piemonte | G06F 16/2291 345/419 |
| 2019/0286921 | A1* | 9/2019 | Liang | G06V 10/82 |

OTHER PUBLICATIONS

Ahmetovic, et al., "Zebra Crossing Spotter: Automatic Population of Spatial Databases for Increased Safety of Blind Travelers", Assets, (2015), 251-258.

Ahmetovic, et al., "Zebra Localizer: identification and localization of pedestrian crossings", Proceedings of the 13th International Conference on Human Computer Interaction with Mobile Devices and Services, MobileHCI '11, New york, NY, USA, ACM, (2011), 1-10.

Babahajiani, et al., "Comprehensive Automated 3D Urban Environment Modelling Using Terrestrial Laser Scanning Point Cloud", IEEE Conference on Computer Vision and Pattern Recognition Workshops, (2016), 652-660.

Babahajiani, et al., "Urban 3D segmentation and modelling from street view images and LiDAR point clouds", Machine Vision and Applications, (2017), 679-694.

Badrinarayanan, Vijay, et al., "SegNet: A Deep Convolutional Encoder-Decoder Architecture for Image Segmentation", arXiv:1511.00561v3 [cs.CV] Oct. 10, 2016, (2016), 1-14.

Badrinarayanan, Vijay, et al., "SegNet: A Deep Convolutional Encoder-Decoder Architecture for Robust Semantic Pixel-Wise Labelling", arXiv:1505.07293v1 [cs.CV] May 27, 2015, (2015), 1-10.

Bar, Hillel, et al., "Recent Progress in Road and Lane Detection—A survey", Mach. Vision Appl vol. 25:3, (2014), 727-745.

Berriel, et al., "Deep Learning Based Large-Scale Automatic Satellite Crosswalk Classification", IEEE Geoscience and Remote Sensing Letters, (2017), 5 pgs.

Chaurasia, et al., "LinkNet: Exploiting Encoder Representations for Efficient Semantic Segmentation", CoRR, (2017), 5 gps.

Coughlan, et al., "A Fast Algorithm for Finding Crosswalks using Figure-Ground Segmentation", Proc. 2nd Workshop on Applications of Computer Vision, in conjunction with ECCV, (2006), 10 pgs.

Demir, et al., "Robocodes: Towards Generative Street Addresses from Satellite Imagery", IEEE International conference on Computer Vision and Pattern Recognition, Earthvision Workshop, (2017), 10 pgs.

Gao, et al., "Automatic extraction of pavement markings on streets from point cloud data of mobile LiDAR", Meas. Sci. Technol. vol. 28, (2017), 13 pgs.

Gurghian, et al., "DeepLanes: End-to-End Lane Position Estimation using Deep Neural Networks", Measurement Science and Technology vol. 28:8, (2017), 38-45.

Hackel, et al., "Semantic3D.Net: A New Large-Scale Point Cloud Classification Benchmark", ISPRS Annals of Photogrammetry, Remote Sensing and Spatial Information Sciences, (2017), 91-98.

He, Kaiming, et al., "Deep Residual Learning for Image Recognition", 2016 IEEE Conference on Computer Vision and Pattern Recognition, (2016), 770-778.

Ioffe, et al., "Balch Normalization: Accelerating Deep Network Training by Reducing Internal Covariate Shift", Proceedings of the 32nd International Conference on Machine Learning, (2015), 448-456.

Ivanchenko, et al., "Detecting and Locating Crosswalks using a Camera Phone", Proc IEEE Comput Soc Conf comput Vis Pattern Recognit, (2008), 17 pgs.

Jarzabek-Rychard, "Reconstruction of Building Outlines in Dense Urban Areas Based on Lidar Data and Address Points", International Archives of the Photogrammetry, Remote Sensing and Spatial information Sciences, (2012), 121-126.

Jin, et al., "Towards an automatic system for road lane markings extraction in large-scale aerial images acquired over rural areas by hierarchical image analysis and Gabor filler", International Journal of Remote Sensing vol. 33:9, (2012), 2747-2769.

Kammel, et al., "Lidar-based lane marker detection and mapping", IEEE Intelligent Vehicles Symposium, (2008), 1137-1142.

Kendall, et al., "Bayesian SegNet: Model Uncertainty in Deep Convolutional Encoder-Decoder Architectures for Scene Understanding", (2015), 11 pgs.

Kim, et al., "End-to-End Ego Lane Estimation based on Sequential Transfer Learning for Self-Driving Cars", IEEE Conference on Computer Vision and Pattern Recognition Workshops, (2017), 1194-1202.

Kingma, Diederik P, et al., "Adam: A Method for Stochastic Optimization", arXiv preprint, arXiv:1412.6980v9 [cs.LG], (Jan. 30, 2017), 15 pgs.

Koester, et al., "Zebra Crossing Detection from Aerial Imagery Across Countries", ICCHP, (2016), 1-8.

Kurath, et al., "OSMDeepOD—Object Detection on Orthophotos with and for VGI", GI Forum vol. 2, (2017), 173-188.

Lin, et al., "Feature Pyramid Networks for Object Detection", CVPR, (2017), 2117-2125.

Lindner, et al., "Multi-Channel Lidar Processing for Lane Detection and Estimation", Proceedings of the 12th International IEEE Conference on Intelligent Transportation Systems, (2009), 202-207.

Mascetti, et al., "Zebra Recognizer: Pedestrian Crossing Recognition for People with Visual Impairment or Blindness", Pattern Recognition vol. 60, (2016), 405-419.

Mastin, et al., "Automatic Registration of LIDAR and Optical Images of Urban Scenes", IEEE Int. Cont. on Computer Vision and Pattern Recognition, (2009), 2639-2646.

Mattyus, et al., "DeepRoadMapper: Extracting Road Topology from Aerial Images", The IEEE International conference on Computer Vision (ICCV), (2017), 3438-3446.

Mattyus, "Enhancing Road Maps by Parsing Aerial Images Around the World", ICCV, IEEE Computer Society, (2015), 1689-1697.

Mattyus, et al., "HD Maps: Fine-grained Road Segmentation by Parsing Ground and Aerial Images", CVPR, IEEE Computer Society, (2016), 3611-3619.

Nair, et al., "Rectified Linear Units Improve Restricted Boltzmann Machines", in Proceedings of the 27th International Conference on Machine Learning, (Jun. 21, 2010), 8 pgs.

Sengupta, et al., "Automatic Dense Visual Semantic Mapping from Street-Level Imagery", IEEE/RSJ International Conference on Intelligent Robots and Systems, (2012), 857-862.

Shelhamer, E., et al., "Fully Convolutional Networks for Semantic Segmentation", IEEE Transactions on Pattern Analysis and Machine Intelligence, 39(4), (Apr. 2017), 640-651.

Teo, et al., "Reconstruction of Complex Buildings using LIDAR and 2D Maps", Innovations in 3D Geo Information Systems, (2006), 10 pgs.

Wang, et al., "TorontoCity: Seeing the World with a Million Eyes", IEEE International Conference on Computer Vision, (2017), 3028-3036.

Wegner, et al., "A higher-order CRF model for road network extraction", CVPR, IEEE Computer Society, (2013), 1698-1705.

Yu, et al., "Multi-Scale Context Aggregation by Dilated Convolutions", ICLR, (2016), 13 pgs.

U.S. Appl. No. 16/353,871, filed Mar. 14, 2019, Structured Prediction Crosswalk Generation.

* cited by examiner

STRUCTURED PREDICTION CROSSWALK GENERATION

CROSS REFERENCE TO RELATED APPLICATIONS

This application is a continuation of U.S. application Ser. No. 16/353,871, filed Mar. 14, 2019, which claims the benefit of U.S. Provisional Application No. 62/642,835, filed Mar. 14, 2018, the entire disclosure of each of which is hereby incorporated by reference in its entirety.

BACKGROUND

An autonomous vehicle (e.g., a driverless car, a driverless automobile, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an object in a route, and to identify relevant roadway markings and signs associated with a route.

SUMMARY

Accordingly, provided are improved systems, devices, products, apparatus, and/or methods for automatically drawing, predicting, and/or providing a crosswalk.

According to some non-limiting embodiments or aspects, provided is a computer-implemented method comprising: receiving, with a computing system comprising one or more processors, image data associated with an image of a roadway including a crosswalk; generating, with the computing system, a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determining, with the computing system, a position of the crosswalk on the roadway based on the plurality of different characteristics, wherein the position includes a first boundary and a second boundary of the crosswalk in the roadway; and providing, with the computing system, map data associated with a map of the roadway, wherein the map data includes the position of the crosswalk on the roadway in the map.

In some non-limiting embodiments or aspects, determining the position of the crosswalk on the roadway based on the plurality of different characteristics further comprises: determining, based on the one or more angles and the image data, a first likelihood of the one or more elements being on the first boundary or the second boundary; determining, based on the one or more angles and the image data, a second likelihood of the one or more elements being between the first boundary and the second boundary; and determining, based on the first likelihood and the second likelihood, whether the position of the crosswalk on the roadway includes the one or more elements.

In some non-limiting embodiments or aspects, the position of the crosswalk on the roadway is determined according to the following function:

$$\max_{\chi_1, \chi_2, \beta} \lambda_l \left( \phi_{seg, \ell, \beta}(\chi_2) - \phi_{seg, \ell, \beta}(\chi_1) \right) + (1 - \lambda_l)\left( \phi_{dt, \ell, \beta}(\chi_2) + \phi_{dt, \ell, \beta}(\chi_1) \right),$$

and $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_l$ is a weight that balances $\phi_{seg}$ and $\phi_{dt}$.

In some non-limiting embodiments or aspects, the segmentation of the one or more elements of the image includes a segmentation image including a plurality of elements inside the first boundary and the second boundary and a plurality of elements outside the first boundary and second boundary.

In some non-limiting embodiments or aspects, the classification of the one or more elements of the image includes a distance map including a plurality of elements associated with at least one of the first boundary and the second boundary, the distance map including at least one distance to the at least one of the first boundary and the second boundary for at least one element of the plurality of elements within a threshold distance of the at least one of the first boundary and the second boundary.

In some non-limiting embodiments or aspects, the line includes at least a portion of a centerline of the roadway.

In some non-limiting embodiments or aspects the one or more angles of the one or more elements comprise a dilated representation of a boundary angle including an x-value and an y-value with respect to the line.

In some non-limiting embodiments or aspects, the method further comprises training, with the computing system, a convolutional neural network by modifying parameters to optimize a loss function of the convolutional neural network that depends on ground truth labels and one or more predictions of the plurality of different characteristics, wherein the loss function comprises a sum of a segmentation loss, an alignment loss, and a boundary loss; processing, with the computing system, the image data associated with the image of the roadway including the crosswalk using the trained convolutional neural network, to generate a plurality of images associated with the plurality of different characteristics of the image.

According to some non-limiting embodiments or aspects, provided is a computing system comprising: one or more processors programmed and/or configured to: receive image data associated with an image of a roadway including a crosswalk; generate a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determine a position of the crosswalk on the roadway based on the plurality of different characteristics, wherein the position includes a first boundary and a second boundary of the crosswalk in the roadway; and provide map data associated with a map of the roadway, wherein the map data includes the position of the crosswalk on the roadway in the map.

In some non-limiting embodiments or aspects, the one or more processors are further programmed or configured to determine the position of the crosswalk on the roadway based on the plurality of different characteristics by: determining, based on the one or more angles and the image data, a first likelihood of the one or more elements being on the first boundary or the second boundary; determining, based on the one or more angles and the image data, a second likelihood of the one or more elements being between the first boundary and the second boundary; and determining, based on the first likelihood and the second likelihood, whether the position of the crosswalk on the roadway includes the one or more elements.

In some non-limiting embodiments or aspects, the position of the crosswalk on the roadway is determined according to the following function:

$$\max_{\chi_1, \chi_2, \beta} \lambda_l \big(\phi_{seg,\ell,\beta}(\chi_2) - \phi_{seg,\ell,\beta}(\chi_1)\big) + (1 - \lambda_l)\big(\phi_{dt,\ell,\beta}(\chi_2) + \phi_{dt,\ell,\beta}(\chi_1)\big),$$

wherein $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_l$ is a weight that balances $\phi_{seg}$ and $\phi_{dt}$.

In some non-limiting embodiments or aspects, the segmentation of the one or more elements of the image includes a segmentation image including a plurality of elements inside the first boundary and the second boundary and a plurality of elements outside the first boundary and second boundary.

In some non-limiting embodiments or aspects, the classification of the one or more elements of the image includes a distance map including a plurality of elements associated with at least one of the first boundary and the second boundary, the distance map including at least one distance to the at least one of the first boundary and the second boundary for at least one element of the plurality of elements within a threshold distance of the at least one of the first boundary and the second boundary.

In some non-limiting embodiments or aspects, the line includes at least a portion of a centerline of the roadway.

In some non-limiting embodiments or aspects, the one or more angles of the one or more elements comprise a dilated representation of a boundary angle including an x value and a y value with respect to the line.

In some non-limiting embodiments or aspects, the one or more processors are further programmed and/or configured to: train a convolutional neural network by modifying parameters to optimize a loss function of the convolutional neural network that depends on ground truth labels and one or more predictions of the plurality of different characteristics, wherein the loss function comprises a sum of a segmentation loss, an alignment loss, and a boundary loss; and process the image data associated with the image of the roadway including the crosswalk using the trained convolutional neural network, to generate a plurality of images associated with the plurality of different characteristics of the image.

According to some non-limiting embodiments or aspects, provided is a computer program product comprising at least one non-transitory computer-readable medium including program instructions that, when executed by at least one processor, cause the at least one processor to: receive image data associated with an image of a roadway including a crosswalk; generate a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determine a position of the crosswalk on the roadway based on the plurality of different characteristics, wherein the position includes a first boundary and a second boundary of the crosswalk in the roadway; and provide map data associated with a map of the roadway, wherein the map data includes the position of the crosswalk on the roadway in the map.

In some non-limiting embodiments or aspects, the instructions cause the at least one processor to determine the position of the crosswalk on the roadway based on the plurality of different characteristics by: determining, based on the one or more angles and the image data, a first likelihood of the one or more elements being on the first boundary or the second boundary; determining, based on the one or more angles and the image data, a second likelihood of the one or more elements being between the first boundary and the second boundary; and determining, based on the first likelihood and the second likelihood, whether the position of the crosswalk on the roadway includes the one or more elements In some non-limiting embodiments or aspects, the position of the crosswalk on the roadway is determined according to the following function:

$$\max_{\chi_1, \chi_2, \beta} \lambda_l \big(\phi_{seg,\ell,\beta}(\chi_2) - \phi_{seg,\ell,\beta}(\chi_1)\big) + (1 - \lambda_l)\big(\phi_{dt,\ell,\beta}(\chi_2) + \phi_{dt,\ell,\beta}(\chi_1)\big),$$

wherein $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_l$ is a weight that balances $\phi_{seg}$ and $\phi_{dt}$.

In some non-limiting embodiments or aspects the line includes at least a portion of a centerline of the roadway.

According to some non-limiting embodiments or aspects, provided is an autonomous vehicle comprising a vehicle computing system that comprises one or more processors, wherein the vehicle computing system is configured to: receive image data associated with an image of a roadway including a crosswalk; generate a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determine a position of the crosswalk on the roadway based on the plurality of different characteristics, wherein the position includes a first boundary and a second boundary of the crosswalk in the roadway; and provide map data associated with a map of the roadway, wherein the map data includes the position of the crosswalk on the roadway in the map.

Further non-limiting embodiments or aspects are set forth in the following numbered clauses:

Clause 1. A computer-implemented method, comprising: receiving, with a computing system comprising one or more processors, image data associated with an image of a roadway including a crosswalk; generating, with the computing system, a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determining, with the computing system, a position of the crosswalk on the roadway based on the plurality of different characteristics, wherein the position includes a first boundary and a second boundary of the crosswalk in the roadway; and providing, with the computing system, map data associated with a map of the roadway, wherein the map data includes the position of the crosswalk on the roadway in the map.

Clause 2: The computer-implemented method of clause 1, wherein determining the position of the crosswalk on the roadway based on the plurality of different characteristics further comprises: determining, based on the one or more angles and the image data, a first likelihood of the one or more elements being on the first boundary or the second boundary; determining, based on the one or more angles and the image data, a second likelihood of the one or more elements being between the first boundary and the second boundary; and determining, based on the first likelihood and the second likelihood, whether the position of the crosswalk on the roadway includes the one or more elements.

Clause 3: The computer-implemented method of clauses 1 and 2, wherein the position of the crosswalk on the roadway is determined according to the following function:

$$\max_{\chi_1,\chi_2,\beta} \lambda_l(\phi_{seg,\ell,\beta}(\chi_2) - \phi_{seg,\ell,\beta}(\chi_1)) + (1 - \lambda_l)(\phi_{dt,\ell,\beta}(\chi_2) + \phi_{dt,\ell,\beta}(\chi_1)),$$

wherein $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_I$ is a weight that balances $\phi_{seg}$ and $\phi_{dt}$.

Clause 4: The computer-implemented method of clauses 1-3, wherein the segmentation of the one or more elements of the image includes a segmentation image including a plurality of elements inside the first boundary and the second boundary and a plurality of elements outside the first boundary and second boundary.

Clause 5: The computer-implemented method of clauses 1-4, wherein the classification of the one or more elements of the image includes a distance map including a plurality of elements associated with at least one of the first boundary and the second boundary, the distance map including at least one distance to the at least one of the first boundary and the second boundary for at least one element of the plurality of elements within a threshold distance of the at least one of the first boundary and the second boundary.

Clause 6: The computer-implemented method of clauses 1-5, wherein the line includes at least a portion of a centerline of the roadway.

Clause 7: The computer-implemented method of clauses 1-6, wherein the one or more angles of the one or more elements comprise a dilated representation of a boundary angle including an x-value and an y-value with respect to the line.

Clause 8: The computer-implemented method of clauses 1-7, further comprising: training, with the computing system, a convolutional neural network by modifying parameters to optimize a loss function of the convolutional neural network that depends on ground truth labels and one or more predictions of the plurality of different characteristics, wherein the loss function comprises a sum of a segmentation loss, an alignment loss, and a boundary loss; processing, with the computing system, the image data associated with the image of the roadway including the crosswalk using the trained convolutional neural network, to generate a plurality of images associated with the plurality of different characteristics of the image.

Clause 9: A computing system, comprising: one or more processors programmed and/or configured to: receive image data associated with an image of a roadway including a crosswalk; generate a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determine a position of the crosswalk on the roadway based on the plurality of different characteristics, wherein the position includes a first boundary and a second boundary of the crosswalk in the roadway; and provide map data associated with a map of the roadway, wherein the map data includes the position of the crosswalk on the roadway in the map.

Clause 10: The computing system of clause 9, wherein the one or more processors are further programmed or configured to determine the position of the crosswalk on the roadway based on the plurality of different characteristics by: determining, based on the one or more angles and the image data, a first likelihood of the one or more elements being on the first boundary or the second boundary; determining, based on the one or more angles and the image data, a second likelihood of the one or more elements being between the first boundary and the second boundary; and determining, based on the first likelihood and the second likelihood, whether the position of the crosswalk on the roadway includes the one or more elements.

Clause 11: The computing system of clauses 9 and 10, wherein the position of the crosswalk on the roadway is determined according to the following function:

$$\max_{\chi_1,\chi_2,\beta} \lambda_l(\phi_{seg,\ell,\beta}(\chi_2) - \phi_{seg,\ell,\beta}(\chi_1)) + (1 - \lambda_l)(\phi_{dt,\ell,\beta}(\chi_2) + \phi_{dt,\ell,\beta}(\chi_1)),$$

wherein $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_I$ is a weight that balances $\phi_{seg}$ and $\phi_{dt}$.

Clause 12: The computing system of clauses 9-11, wherein the segmentation of the one or more elements of the image includes a segmentation image including a plurality of elements inside the first boundary and the second boundary and a plurality of elements outside the first boundary and second boundary.

Clause 13: The computing system of clauses 9-12, wherein the classification of the one or more elements of the image includes a distance map including a plurality of elements associated with at least one of the first boundary and the second boundary, the distance map including at least one distance to the at least one of the first boundary and the second boundary for at least one element of the plurality of elements within a threshold distance of the at least one of the first boundary and the second boundary.

Clause 14: The computing system of clauses 9-13, wherein the line includes at least a portion of a centerline of the roadway.

Clause 15: The computing system of clauses 9-14, wherein the one or more angles of the one or more elements comprise a dilated representation of a boundary angle including an x value and a y value with respect to the line.

Clause 16: The computing system of clauses 9-15, wherein the one or more processors are further programmed and/or configured to: train a convolutional neural network by modifying parameters to optimize a loss function of the convolutional neural network that depends on ground truth labels and one or more predictions of the plurality of different characteristics, wherein the loss function comprises a sum of a segmentation loss, an alignment loss, and a boundary loss; and process the image data associated with the image of the roadway including the crosswalk using the trained convolutional neural network, to generate a plurality of images associated with the plurality of different characteristics of the image.

Clause 17: A computer program product comprising at least one non-transitory computer-readable medium including program instructions that, when executed by at least one processor, cause the at least one processor to: receive image data associated with an image of a roadway including a crosswalk; generate a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determine a position of the crosswalk on the roadway based on the plurality of different characteristics, wherein the position includes a first boundary and a second boundary of the crosswalk in the roadway; and provide map data associated with a map of the roadway, wherein the map data includes the position of the crosswalk on the roadway in the map.

Clause 18: The computer program product of clause 17, wherein the instructions cause the at least one processor to determine the position of the crosswalk on the roadway based on the plurality of different characteristics by: determining, based on the one or more angles and the image data, a first likelihood of the one or more elements being on the first boundary or the second boundary; determining, based on the one or more angles and the image data, a second likelihood of the one or more elements being between the first boundary and the second boundary; and determining, based on the first likelihood and the second likelihood, whether the position of the crosswalk on the roadway includes the one or more elements.

Clause 19: The computer program product of clause 17 and 18, wherein the position of the crosswalk on the roadway is determined according to the following function:

$$\max_{\chi_1,\chi_2,\beta} \lambda_I(\phi_{seg,\ell,\beta}(\chi_2) - \phi_{seg,\ell,\beta}(\chi_1)) + (1-\lambda_I)(\phi_{dt,\ell,\beta}(\chi_2) + \phi_{dt,\ell,\beta}(\chi_1)),$$

wherein $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_I$ is a weight that balances $\phi_{seg}$ and $\phi_{dt}$.

Clause 20: The computer program product of clause 17-19, wherein the line includes at least a portion of a centerline of the roadway.

DETAILED DESCRIPTION

Figure 1:
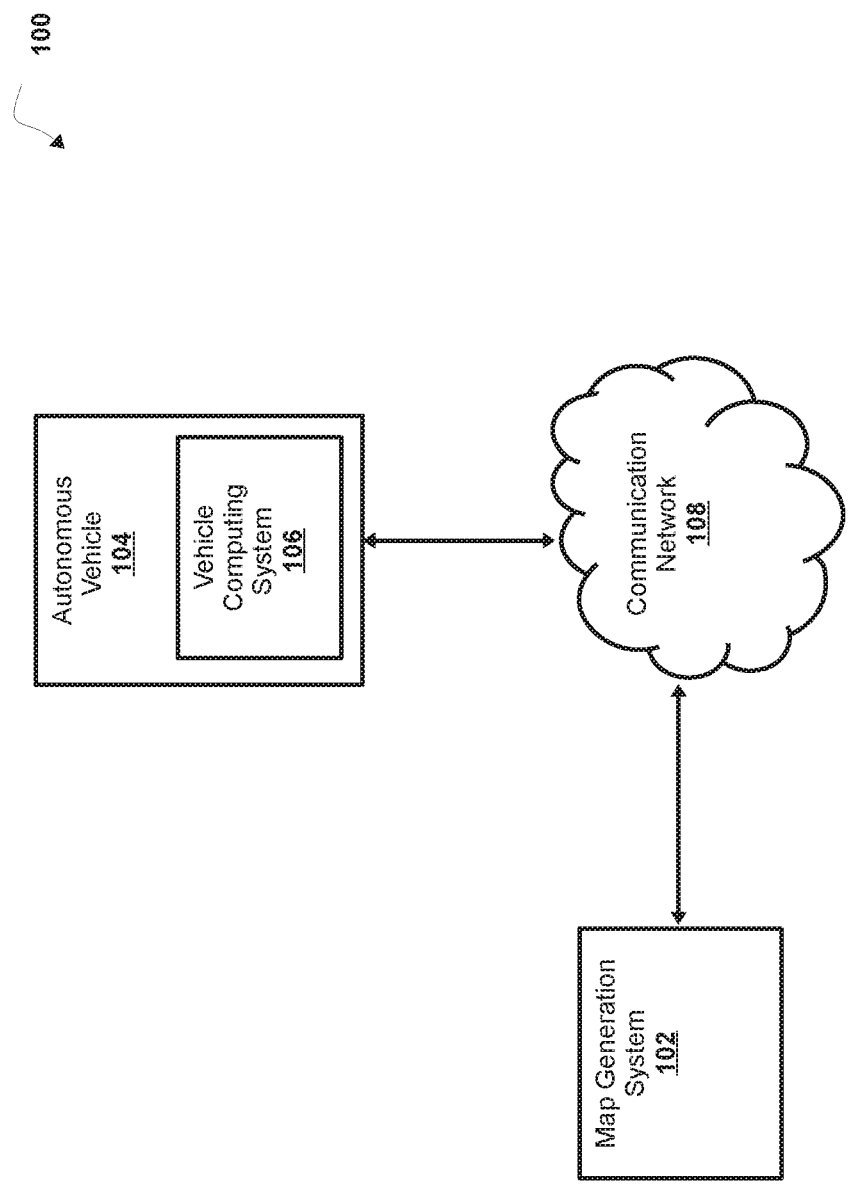
FIG. 1 is a diagram of non-limiting embodiments or aspects of an environment in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

In existing systems, objects in an AV map are produced manually by a human operator identifying, drawing, and/or labeling roadways and/or crosswalks in a map of the geographic location. For example, in a manually produced AV map, crosswalks are hand-drawn and manually established by using image data and map data that has been provided by the AV map. Crosswalks are determined manually by searching intersections or other common locations of the map to observe shapes and styles associated with a crosswalk in the map data (e.g., a map based on map data, etc.) associated with a crosswalk.

However, such locations in the map data may be incomplete, inaccurate, and/or insufficient to determine the location of a crosswalk. Also, crosswalks can be difficult to locate manually and/or use a time intensive process requiring specialists (e.g., a specialist involved in the production of a map, etc.) to find and draw (e.g., label, annotate, position, orient, etc.) crosswalks in a map. For example, specialists may examine an area of a map searching for indications (e.g., one or more lines, one or more road edges, one or more boundary angles, a centerline, a sign, a speed limit, etc.) in the map data associated with the area that may potentially provide help in determining a shape and position of a crosswalk (e.g., a crosswalk polygon, etc.), which presents a difficulty associated with parsing through many values and/or visually obscure representations of the area. Many times working with poor representations, manually determining a crosswalk is also time consuming as a specialist must judge if an area of the map includes characteristics that are both representative and sufficient to encode the crosswalk into the map by looking at changes in the characteristics in the AV map (e.g., changes in the angle of a crosswalk, etc.). For example, determining an angle, a boundary, or an edge of a crosswalk manually are processing-intensive and inaccurate.

One of the aspects that makes AV maps particularly difficult to draw (e.g., to create, to generate, etc.) is the extent to which the AV map must accurately represent the position of an object (e.g., a crosswalk, a boundary, etc.), a shape, and an orientation in the map. An AV may not know (e.g., may not obtain information to determine, etc.) when and where a crosswalk exists relative to a roadway in a geographic location when an AV map includes manual designations of crosswalks that inaccurately represent the crosswalk and/or may not determine with sufficient speed, accuracy, and/or precision (e.g., within a threshold distance, etc.) whether a crosswalk may cause or create a safety issue unless the crosswalk is accurately positioned and represented in the AV map with a proper orientation in the road or intersection. In addition, an AV using the AV map may not be able to travel in a roadway through a geographical location having a crosswalk if the AV is not able to determine (e.g., read, etc.) where the crosswalk is located in a roadway, and/or if the position of the crosswalk is based on an incorrect judgment and/or includes an inaccurate representation (e.g., a hole in the boundary, abbreviated boundaries, etc.) in the AV map. Further, generating an AV map that includes manual designations of crosswalks in a geographic location may consume a relatively large amount of network and/or processing resources and a relatively large amount of time, as an AV map that includes manual designations for each crosswalk in a geographic location may not be sufficiently generated based on a lack of network and/or processing resources, a lack of time to generate the AV map, and/or a lack of data to generate the AV map. Still further, map data may be insufficient or deficient, such that a crosswalk may not be determined (e.g., not accurately and/or efficiently determined) and/or created, and crosswalks that are created may not accurately and/or efficiently represent the crosswalk in the AV map. As an example, if a crosswalk is improperly or inaccurately identified in a geographic location, autonomous travel may not be available to properly control an AV (e.g., an AV traveling in the roadway of the geographic location may not accurately predict that a crosswalk exists in the path, an AV may determine a crosswalk exists in the roadway that may not be represented in the AV map, etc.).

Non-limiting embodiments or aspects of the present disclosure are directed to systems, devices, products, apparatuses, and/or methods for automatically drawing crosswalks based on image data associated with one or more traversals of a roadway by one or more vehicles and/or providing crosswalk information in an AV map for map production. For example, a method may include receiving, with a computing system comprising one or more processors, image data associated with an image of a roadway including a crosswalk; generating, with the computing system, a plurality of different characteristics of the image based on the image data, wherein the plurality of different characteristics include a classification of one or more elements of the image, a segmentation of the one or more elements of the image, and one or more angles of the one or more elements of the image with respect to a line in the roadway; determining, with the computing system, a position of the crosswalk on the roadway based on the plurality of different characteristics, wherein the position includes a first boundary and a second boundary of the crosswalk in the roadway; and providing, with the computing system, map data associated with a map of the roadway, wherein the map data includes the position of the crosswalk on the roadway in the map.

In this way, rather than manually determining or labeling crosswalks in a map, modeling of image data for generating crosswalk characteristics provides structured crosswalk information for automatically drawing images of a crosswalk area, may more accurately and/or efficiently use characteristics of one or more elements in an image associated with a map to determine a first boundary, a second boundary (e.g., a first line and a second line of a crosswalk, etc.), and/or an angle to effectively enable a more accurate and efficient position in a drawing of a crosswalk in a geographic location, and provides tools, structure, and/or information signals by which crosswalks may be drawn, corrected, and/or adjusted in a map. Accordingly, time-intensive mapping of roadways (e.g., mapping of roadways with potentially obscured and/or hard to detect crosswalks, etc.) may be reduced, navigation range and safety of AV travel may be enhanced, networking and processing time for generating AV maps may be reduced, and/or a time associated with human editing of an AV map (e.g., to label, to annotate, to position, to orient, etc.) may be reduced Referring now to FIG. 1, FIG. 1 is a diagram of an example environment 100 in which devices, systems, methods, and/or products described herein may be implemented. As shown in FIG. 1, environment 100 includes map generation system 102, autonomous vehicle 104 including vehicle computing system 106, and communication network 108. Systems and/or devices of environment 100 can interconnect via wired connections, wireless connections, or a combination of wired and wireless connections.

In some non-limiting embodiments or aspects, map generation system 102 includes one or more devices capable of obtaining image data (e.g., images, camera images, overhead images, LIDAR images, etc.) associated with one or more traversals of a roadway in a geographic location by one or more vehicles. In some non-limiting embodiments or aspects, map generation system 102 includes one or more devices capable of receiving image data associated with an image of a roadway including a crosswalk; generating a plurality of different characteristics of the image based on the image data, wherein the plurality of different characteristics include a classification of one or more elements of the image, a segmentation of the one or more elements of the image, and an angle of the one or more elements of the image with respect to a line in the roadway; determining a position of the crosswalk based on the plurality of different characteristics, wherein the position includes a first boundary and a second boundary of the crosswalk in the roadway; and providing map data associated with a map of the roadway, wherein the map data includes the position of the crosswalk on the roadway in the map. For example, map generation system 102 can include one or more computing systems including one or more processors (e.g., one or more servers, etc.).

In some non-limiting embodiments or aspects, map generation system 102 includes one or more devices capable of obtaining image data (e.g., images, camera images, overhead images, a LIDAR point cloud, a RADAR image, etc.) and/or sensor data that can be converted to image data (e.g., accelerometers, gyroscopes, etc.) associated with one or more traversals of a roadway in a geographic location by one or more vehicles. As an example, autonomous vehicle 104 (e.g., vehicle computing system 106, etc.) includes one or more devices capable of obtaining sensor data associated with parameters (e.g., pitch, pitch range, yaw, yaw range, longitudinal acceleration, latitudinal speed, longitudinal speed, latitudinal speed, etc.) to determine the motion (e.g., positions, heading, pose, velocity, etc.) of the AV as it traverses a route in a geographic location. All of these different parameters may present a different value when an AV traverses a crosswalk. While the AV is traveling, it can factor in changes in elevation, such as hills or turns, and pass them to the map generation system 102 to factor into the map data associated with an environment surrounding autonomous vehicle 104 while controlling travel, operation, and/or routing of autonomous vehicle 104 based on map data, feature data, position data, state data, sensor data, motion data, test data, and/or the like.

In some non-limiting embodiments or aspects, autonomous vehicle 104 (e.g., vehicle computing system 106, etc.) includes one or more devices capable of obtaining sensor data (e.g., image data, LIDAR data, Red Green Blue (RGB) data, etc.) associated with a detected object in an environment surrounding autonomous vehicle 104. For example, autonomous vehicle 104 can include one or more computing systems including one or more processors (e.g., one or more servers, etc.) and one or more devices capable of obtaining sensor data (e.g., one or more wide angle cameras, LIDAR, RADAR, etc.). As an example, autonomous vehicle 104 (e.g., vehicle computing system 106, etc.) includes one or more devices capable of obtaining sensor data associated with parameters to determine the motion (e.g., positions, heading, pose, velocity, etc.) of the AV as it traverses a route in a geographic location. All of these different parameters present a different value when an AV traverses a crosswalk. While the AV is traveling, it can obtain images of an environment surrounding an AV and pass image data to the map generation system 102 to factor into the map data associated with an environment surrounding autonomous vehicle 104 while controlling travel, operation, and/or routing of autonomous vehicle 104 based on map data, feature data, position data, state data, sensor data, motion data, test data, and/or the like. In such an example, the one or more devices may obtain sensor data associated with detecting roadway features including a crosswalk in an environment surrounding autonomous vehicle 104, for example, by controlling the one or more devices of autonomous vehicle 104 to detect image data in a geographic location based on map data, feature data, position data, state data, motion data, and/or the like. Further details regarding non-limiting embodiments of autonomous vehicle 104 are provided below with regard to FIG. 2.

In some non-limiting embodiments or aspects, map generation system 102 and/or autonomous vehicle 104 include one or more devices capable of receiving, storing, and/or providing map data (e.g., map data, AV map data, coverage map data, hybrid map data, submap data, Uber's Hexagonal Hierarchical Spatial Index (H3) data, Google's S2 geometry data, etc.) associated with a map (e.g., a map, a submap, an AV map, a coverage map, a hybrid map, an H3 cell, an S2 cell, etc.) of a geographic location (e.g., a country, a state, a city, a portion of a city, a township, a portion of a township, etc.). For example, maps can be used for routing autonomous vehicle 104 on a roadway specified in the map.

In some non-limiting embodiments or aspects, a road refers to a paved or otherwise improved path between two places that allows for travel by a vehicle (e.g., autonomous vehicle 104, etc.). Additionally or alternatively, a road includes a roadway and a sidewalk in proximity to (e.g., adjacent, near, next to, touching, etc.) the roadway. In some non-limiting embodiments or aspects, a roadway includes a portion of road on which a vehicle is intended to travel and is not restricted by a physical barrier or a separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), a crossing lane (e.g., a crosswalk in which a pedestrian and/or other terrestrial animal crosses, etc.) and/or the like. In some non-limiting embodiments or aspects, a roadway is connected to another roadway, for example, a lane of a roadway is connected to another lane of the roadway, and/or a lane of the roadway is connected to a lane of another roadway.

In some non-limiting embodiments or aspects, a roadway is associated with map data that defines one or more attributes of (e.g., metadata associated with) the roadway (e.g., attributes of a roadway in a geographic location, attributes of a segment of a roadway, attributes of a lane of a roadway, attributes of an edge of a roadway, attributes of a driving path of a roadway, etc.). In some non-limiting embodiments or aspects, an attribute of a roadway includes an edge of a road (e.g., a location of an edge of a road, a distance of a location from an edge of a road, an indication whether a location is within an edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), a centerline of a roadway (e.g., an indication of a centerline path in at least one lane of the roadway for controlling autonomous vehicle 104 during operation (e.g., following, traveling, traversing, routing, etc.) on a driving path, etc.), a driving path of a roadway (e.g., one or more trajectories that autonomous vehicle 104 can traverse in the roadway and an indication of the location of at least one feature in the roadway a lateral distance from the driving path, etc.), one or more objects (e.g., a vehicle, a crosswalk, an edge of a road, a traffic face, vegetation, a pedestrian, a structure, a building, a sign, a lamppost, signage, a traffic sign, a bicycle, a railway track, a hazardous object, etc.) in proximity to and/or within a road (e.g., objects in proximity to the edges of a road and/or within the edges of a road), a sidewalk of a road, and/or the like. In some non-limiting embodiments or aspects, a map of a geographic location includes one or more routes that include one or more roadways. In some non-limiting embodiments or aspects, map data associated with a map of the geographic location associates each roadway of the one or more roadways with an indication of whether an autonomous vehicle 104 can travel on that roadway.

In some non-limiting embodiments or aspects, a driving path may include feature data associated with features of the roadway (e.g., a section of curb, a marker, an object, etc.) for controlling autonomous vehicle 104 to autonomously determine objects in the roadway and/or feature data associated with longitudinal regions (e.g., a lane extending from the front or back edge of an AV, etc.) and with lateral regions (e.g., left and right edges of a lane in the roadway, etc.) of the driving path. As an example, a driving path includes a trajectory (e.g., a spline, a polyline, etc.), and a location of features (e.g., a portion of the feature, a section of the feature, etc.) in the roadway, with a link for transitioning between an entry point and an end point of the driving path based on at least one of heading information, curvature information, vehicle pose, acceleration information, and/or the like, and intersections with features in the roadway (e.g., real objects, paint markers, curbs, other lane paths) of a lateral region (e.g., polygon) projecting from the path with objects of interest.

In some non-limiting embodiments or aspects, communication network 108 includes one or more wired and/or wireless networks. For example, communication network 108 includes a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
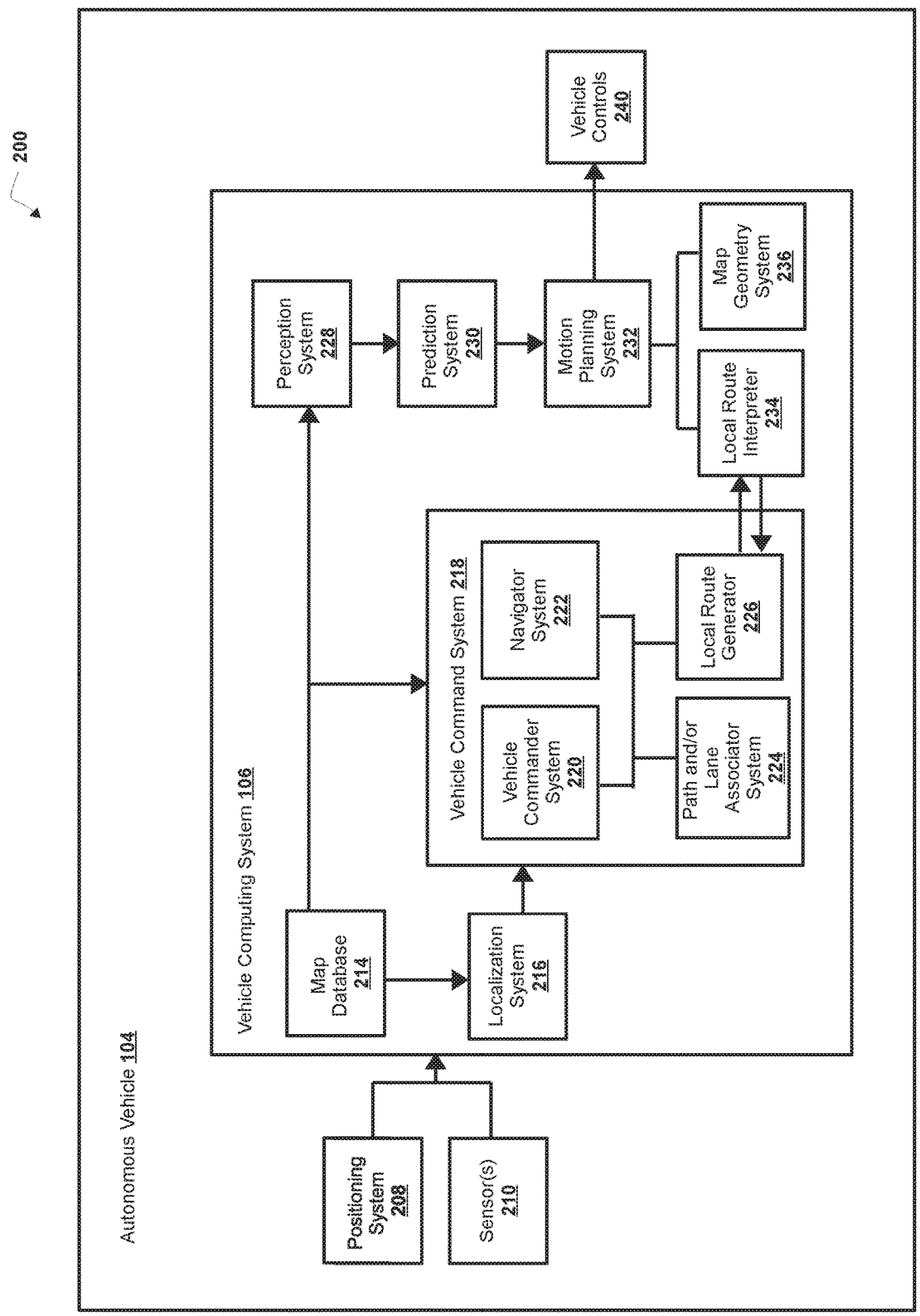
FIG. 2 is a diagram of non-limiting embodiments or aspects of a system for controlling an autonomous vehicle shown in FIG. 1.

Referring now to FIG. 2, FIG. 2 is a diagram of a non-limiting embodiment or aspect of a system 200 for controlling autonomous vehicle 104. As shown in FIG. 2, vehicle computing system 106 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments or aspects, vehicle computing system 106 is connected to or includes positioning system 208. In some non-limiting embodiments or aspects, positioning system 208 determines a position (e.g., a current position, a past position, etc.) of autonomous vehicle 104. In some non-limiting embodiments or aspects, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments or aspects, the position of autonomous vehicle 104 is used by vehicle computing system 106.

In some non-limiting embodiments or aspects, vehicle computing system 106 receives sensor data from one or more sensors 210 that are coupled to or otherwise included in autonomous vehicle 104. For example, one or more sensors 210 includes a Light Detection and Ranging (LIDAR) system, a Radio Detection and Ranging (RADAR) system, one or more cameras (e.g., visible spectrum cameras, infrared cameras, etc.), one more devices for collecting positioning and pose data (e.g., pitch, latitude, longitude, altitude, etc.) and/or the like. In some non-limiting embodiments or aspects, one or more sensors 210 collect sensor data that includes data that describes a location (e.g., in three-dimensional space relative to autonomous vehicle 104) of points that correspond to a location of the autonomous vehicle 104. In some non-limiting embodiments or aspects, the sensor data includes data that describes a location of objects within the surrounding environment of autonomous vehicle 104. In some non-limiting embodiments or aspects, one or more sensors 210 collect sensor data that includes data that describes a location (e.g., in three-dimensional space relative to autonomous vehicle 104) of points that correspond to objects within the surrounding environment of autonomous vehicle 104.

In some non-limiting embodiments or aspects, the sensor data includes a location (e.g., a location in three-dimensional space relative to the LIDAR system) of a number of points (e.g., a point cloud) that correspond to objects that have reflected a ranging laser. In some non-limiting embodiments or aspects, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments or aspects, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments or aspects, the sensor data includes a location (e.g., a location in three-dimensional space relative to the RADAR system) of a number of points that correspond to objects that have reflected a ranging radio wave. In some non-limiting embodiments or aspects, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments or aspects, the RADAR system provides information about the location and/or the speed of an object relative to the RADAR system based on the radio waves.

In some non-limiting embodiments or aspects, image processing techniques (e.g., range imaging techniques, as an example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments or aspects, map database 214 provides detailed information associated with the map, features of the roadway in the geographic location, and information about the surrounding environment of autonomous vehicle 104 for autonomous vehicle 104 to use while driving (e.g., traversing a route, planning a route, determining a motion plan, controlling autonomous vehicle 104, etc.).

In some non-limiting embodiments or aspects, vehicle computing system 106 receives a vehicle pose from localization system 216 based on one or more sensors 210 that are coupled to or otherwise included in autonomous vehicle 104. In some non-limiting embodiments or aspects, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer, for determining a map-relative vehicle pose. For example, low quality pose localizer determines a low quality pose estimate in response to receiving position data from positioning system 208 for operating (e.g., routing, navigating, controlling, etc.) autonomous vehicle 104 under manual control (e.g., in a coverage lane, on a coverage driving path, etc.). In some non-limiting embodiments or aspects, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane, on an AV driving path, etc.).

In some non-limiting embodiments or aspects, vehicle command system 218 includes vehicle commander system 220, navigator system 222, path and/or lane associator system 224, and local route generator 226 that cooperate to route and/or navigate autonomous vehicle 104 in a geographic location. In some non-limiting embodiments or aspects, vehicle commander system 220 provides tracking of a current objective of autonomous vehicle 104, such as a current service, a target pose, a coverage plan (e.g., development testing, etc.), and/or the like. In some non-limiting embodiments or aspects, navigator system 222 determines and/or provides a route plan (e.g., a route between a starting location or a current location and a destination location, etc.) for autonomous vehicle 104 based on a current state of autonomous vehicle 104, map data (e.g., lane graph, driving paths, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) and/or one or more driving paths (e.g., a current driving path, a future driving path, etc.) in one or more roadways that autonomous vehicle 104 can traverse on a route to a destination location (e.g., a target location, a trip drop-off location, etc.).

In some non-limiting embodiments or aspects, navigator system 222 determines a route plan based on one or more lanes and/or one or more driving paths received from path and/or lane associator system 224. In some non-limiting embodiments or aspects, path and/or lane associator system 224 determines one or more lanes and/or one or more driving paths of a route in response to receiving a vehicle pose from localization system 216. For example, path and/or lane associator system 224 determines, based on the vehicle pose, that autonomous vehicle 104 is on a coverage lane and/or a coverage driving path, and in response to determining that autonomous vehicle 104 is on the coverage lane and/or the coverage driving path, determines one or more candidate lanes (e.g., routable lanes, etc.) and/or one or more candidate driving paths (e.g., routable driving paths, etc.) within a distance of the vehicle pose associated with autonomous vehicle 104. For example, path and/or lane associator system 224 determines, based on the vehicle pose, that autonomous vehicle 104 is on an AV lane and/or an AV driving path, and in response to determining that autonomous vehicle 104 is on the AV lane and/or the AV driving path, determines one or more candidate lanes (e.g., routable lanes, etc.) and/or one or more candidate driving paths (e.g., routable driving paths, etc.) within a distance of the vehicle pose associated with autonomous vehicle 104. In some non-limiting embodiments or aspects, navigator system 222 generates a cost function for each of the one or more candidate lanes and/or the one or more candidate driving paths that autonomous vehicle 104 may traverse on a route to a destination location. For example, navigator system 222 generates a cost function that describes a cost (e.g., a cost over a time period) of following (e.g., adhering to) one or more lanes and/or one or more driving paths that may be used to reach the destination location (e.g., a target pose, etc.).

In some non-limiting embodiments or aspects, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments or aspects, local route generator 226 may determine a number of route options based on a predetermined number, a current location of the AV, a current service of the AV, and/or the like.

In some non-limiting embodiments or aspects, perception system 228 detects and/or tracks objects (e.g., bumps, depressions, vehicles, pedestrians, bicycles, and the like) that are proximate to (e.g., in proximity to the surrounding environment of) autonomous vehicle 104 over a time period. In some non-limiting embodiments or aspects, perception system 228 can retrieve (e.g., obtain) map data from map database 214 that provides detailed information about the surrounding environment of autonomous vehicle 104.

In some non-limiting embodiments or aspects, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments or aspects, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments or aspects, perception system 228 determines state data for an object over a number of iterations of determining state data. For example, perception system 228 updates the state data for each object of a plurality of objects during each iteration.

In some non-limiting embodiments or aspects, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments or aspects, prediction system 230 predicts future movement of an object according to a probable class of the objects, one or more conditions, one or more observed locations of the object, and/or map data. For example, prediction system 230 predicts a future movement of an object according to one or more prior probability distributions including mover classifications, one or more motion paths, and/or one or more driving paths based on detection of the object and/or movement of the object.

In some non-limiting embodiments or aspects, prediction system 230 predicts that an object will adhere to the object's direction of travel according to the speed of the object. In some non-limiting embodiments or aspects, prediction system 230 uses machine learning techniques or modeling techniques to make a prediction based on state data associated with an object.

In some non-limiting embodiments or aspects, prediction system 230 predicts future movement of an object according to one or more observed locations of a static object in the roadway (e.g., a crosswalk, etc.), and/or map data.

In some non-limiting embodiments or aspects, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments or aspects, motion planning system 232 receives a route plan as a command from navigator system 222. In some non-limiting embodiments or aspects, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments or aspects, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments or aspects, motion planning system 232 determines a cost of following a motion plan. For example, motion planning system 232 determines a motion plan for autonomous vehicle 104 based on one or more cost functions. In some non-limiting embodiments or aspects, motion planning system 232 determines a motion plan (e.g., a selected motion plan, an optimized motion plan, a preferred motion plan, etc.) that minimizes a cost function. In some non-limiting embodiments or aspects, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments or aspects, motion planning system 232 can determine a motion plan for autonomous vehicle 104 based on the predicted future locations and/or motion paths for the object provided by the prediction system 230 and/or the state data for the object provided by the perception system 228. Stated differently, given information about current locations of objects and/or predicted future locations and/or motion paths of objects, the motion planning system 232 can determine a motion plan for autonomous vehicle 104 that navigates autonomous vehicle 104 relative to the objects at such locations according to the cost function.

In some non-limiting embodiments or aspects, motion planning system 232 communicates with local route interpreter 234 and map geometry system 236. In some non-limiting embodiments or aspects, local route interpreter 234 may receive and/or process route options from local route generator 226. For example, local route interpreter 234 may determine a new or updated route for travel of autonomous vehicle 104. As an example, one or more lanes and/or one or more driving paths in a local route may be determined by local route interpreter 234 and map geometry system 236. For example, local route interpreter 234 can determine a route option and map geometry system 236 determines one or more lanes and/or one or more driving paths in the route option for controlling the motion of autonomous vehicle 104.

Figure 3:
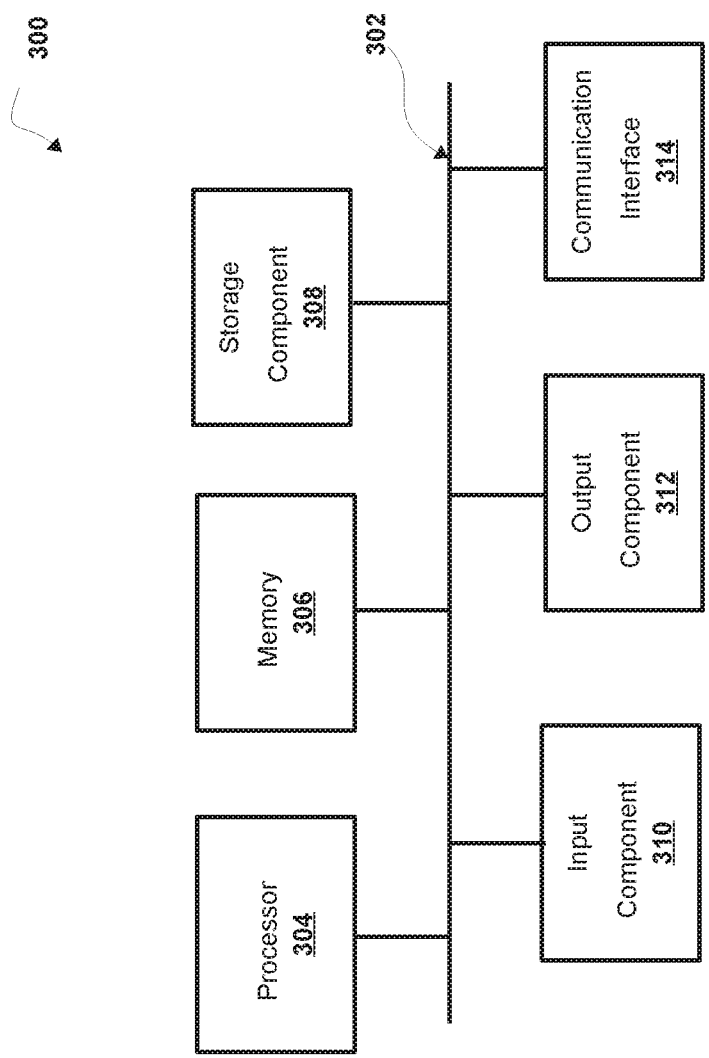
FIG. 3 is a diagram of non-limiting embodiments or aspects of components of one or more devices and/or one or more systems of FIGS. 1 and 2.

Referring now to FIG. 3, FIG. 3 is a diagram of example components of a device 300. Device 300 can correspond to one or more devices of map generation system 102 and/or one or more devices of (e.g., one or more devices of a system of) autonomous vehicle 104. In some non-limiting embodiments or aspects, one or more devices of map generation system 102 and/or one or more devices of (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. In some non-limiting embodiments or aspects, the information may include data (e.g., sensor data, log data, one or more prior probability distributions, etc.) associated with one or more traversals of a roadway by one or more vehicles.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
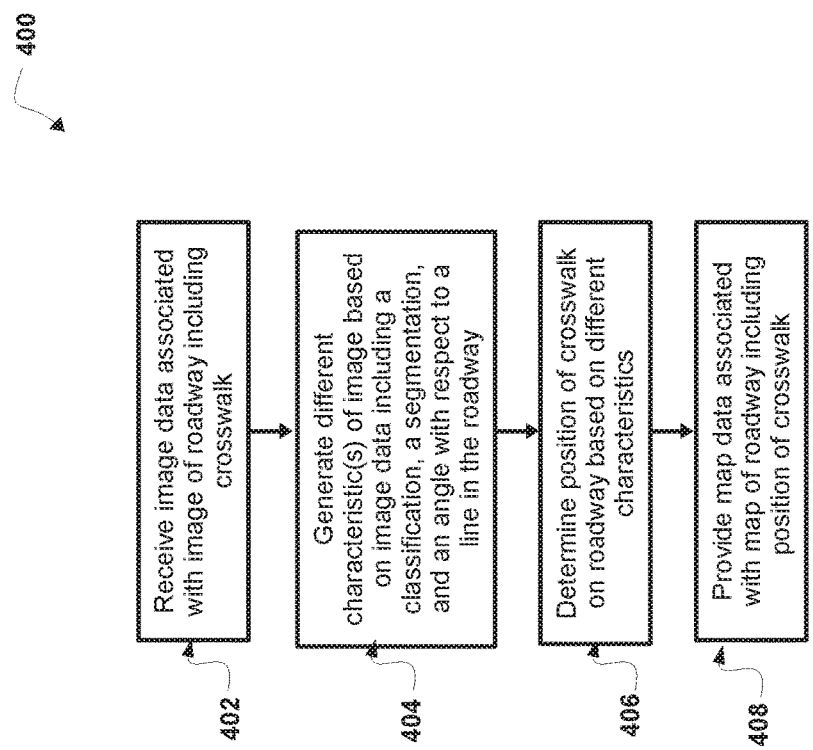
FIG. 4 is a flowchart of non-limiting embodiments or aspects of a process for crosswalk generation.

Referring now to FIG. 4, FIG. 4 is a flowchart of a non-limiting embodiment of a process 400 for determining a crosswalk. In some non-limiting embodiments or aspects, one or more of the steps of process 400 are performed (e.g., completely, partially, etc.) by map generation system 102 (e.g., one or more devices of map generation system 102, etc.). In some non-limiting embodiments or aspects, one or more of the steps of process 400 are performed (e.g., completely, partially, etc.) by another device or a group of devices separate from or including map generation system 102, such as autonomous vehicle 104 (e.g., one or more devices of autonomous vehicle 104, etc.).

As shown in FIG. 4, at step 402, process 400 includes receiving image data associated with an image of a roadway including a crosswalk. For example, map generation system 102 receives image data associated with an image of a roadway including a crosswalk. As an example, map generation system 102 receives (e.g., obtains, retrieves, etc.) image data associated with an image of a roadway including a crosswalk.

In some non-limiting embodiments or aspects, image data includes a histogram (e.g., a two dimensional histogram, a two dimensional histogram of cloud points representing a feature of a road, a normalized histogram, a feature map, etc.) associated with a feature of a road (e.g., a crosswalk, an intersection, etc.) included in the geographic area. In some non-limiting embodiments or aspects, a histogram may include a value (e.g., a number between 0-255) of a color of each element (e.g., a pixel) in an image of the geographic area. In some non-limiting embodiments or aspects, the value of the color may vary among shades of red, green, and blue.

In some non-limiting embodiments or aspects, image data may include a histogram associated with an object in proximity to and/or within a road. Additionally or alternatively, image data may include a histogram associated with a road edge of a road (e.g., a histogram of a distance of a location from a road edge of a road, a histogram of a location within and/or outside of a road edge of a road, etc.), a histogram of a roadway of a road (e.g., a histogram of a lane of a roadway of a road, a histogram of a travel lane of a roadway, a histogram of a parking lane of a roadway, etc.), and/or a histogram of a crosswalk of a road. In some non-limiting embodiments or aspects, a histogram associated with an object in proximity to and/or within the road may indicate a probability mass concentrated around the object.

Additionally or alternatively, image data may include a histogram of an intensity of a color (e.g., black, white, etc.) in the image of the geographic area. In some non-limiting embodiments or aspects, map generation system 102 may determine a homogenous area of a geographic area based on the histogram of the intensity of the color. For example, map generation system 102 may determine a lane of a roadway (e.g., a parking lane, a travel lane, etc.) in the geographic area based on the intensity of the color being the same in the portion of the geographic area that includes the lane. Additionally or alternatively, image data may include a top down camera image (e.g., a synthesized Red Green Blue (RGB) image) of the geographic area. In some non-limiting embodiments or aspects, map generation system 102 may determine a homogenous area of a geographic area based on the top down camera image. For example, map generation system 102 may determine a crosswalk of a roadway in the geographic area based on the color being the same in the top down camera image of the geographic area that includes the crosswalk.

In some non-limiting embodiments or aspects, map generation system 102 obtains image data that includes parameter information associated with one or more parameters collected as a vehicle transitions through a sequence of poses while traversing a roadway in a geographic location. As an example, map generation system 102 obtains image data collected by autonomous vehicles and/or non-autonomous, human controlled vehicles as the vehicles travel on a roadway in a geographic region. For example, sensor data may be collected by vehicles (e.g., a map collection vehicle, etc.) during travel, specifically for collecting data for mapping and/or during normal autonomy operations (e.g., non-mapping specific, etc.). As an example, vehicle computing system 106 of autonomous vehicle 104 can obtain sensor data that has been stored in vehicle logs as autonomous vehicle 104 traverses a roadway. The sensor data in the vehicle logs can be stored locally and/or sent to map generation system 102 to be processed (e.g., stored, chunked, aggregated, etc.), and include one or more parameters, such as, for example, x-value coordinates (e.g., a latitude, etc.), y-value coordinates (e.g., a longitude, etc.), z-value coordinates (e.g., an elevation, height, or altitude relative to the ground and/or sea level, etc.), heading (e.g., a yaw, etc.), pitch of the vehicle (e.g., a pitch angle, grade, or incline that is positive for upward movement of the vehicle nose and negative for downward movement of the vehicle nose, etc.), pitch rate, longitudinal speed, longitudinal acceleration, yaw, yaw rate, latitudinal speed, latitudinal acceleration, roll, roll rate, and/or the like.

Figure 5:
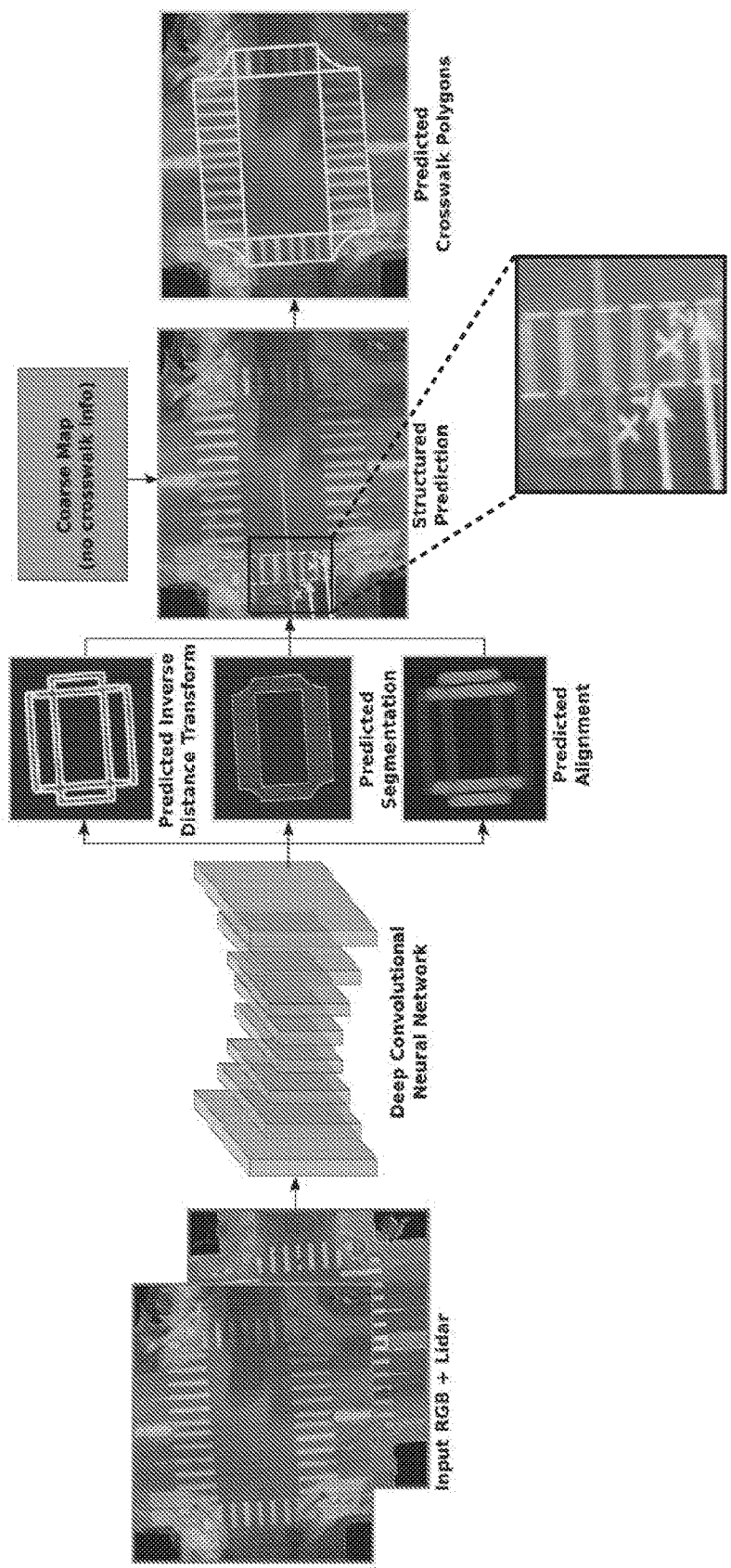
FIG. 5 is a diagram of non-limiting embodiments or aspects of a crosswalk generation model.

Referring now to FIG. 5, FIG. 5 shows an example of a diagram of a model for receiving image data (e.g., input data, input images, etc.) and outputting one or more characteristics of the input data. For example, input images include LIDAR data (e.g., LIDAR points, etc.) and camera images that are projected onto the ground to produce input images from a bird's eye view. As an example, map generation system 102 uses a trained convolutional neural network (CNN) to generate (e.g., produce, etc.) one or more feature maps, (e.g., three feature maps corresponding to segmentation, classification, and alignment, etc.). For example, map generation system 102 concatenates the input images together to form a 4 channel input, with 3 dimensions for RGB and one for LIDAR intensity. In some non-limiting embodiments or aspects, map generation system 102 processes the image data associated with the image of the roadway including the crosswalk using the trained convolutional neural network to generate a plurality of images associated with the plurality of different characteristics of the image.

In some non-limiting embodiments or aspects, map generation system 102 uses the one or more feature maps output by the CNN to perform inference. For example, map generation system 102 provides the image data associated with a crosswalk to a convolutional neural network. In some non-limiting embodiments or aspects, a map is used which provides road centerlines and intersection polygons. In some non-limiting embodiments or aspects, map generation system 102 performs a structured prediction to determine two boundaries x1 and x2 (e.g., optimal boundaries, best boundaries, etc.) along with an angle β (e.g., an optimal angle, a best angle, etc.) by maximizing an optimization function (e.g., a structured energy function, etc.).

In some non-limiting embodiments or aspects, map generation system 102 overlays the image maps on road centerlines and intersection polygons that are typically available in publicly available maps such as the OpenStreetMap (OSM) project to parameterize a crosswalk in a structured way, where a crosswalk is associated with a correct topology and shape. As an example, map generation system 102 determines where a crosswalk occurs (e.g., an intersection, a crossing lane, etc.) given the topological graphs of OSM.

With continued reference to FIG. 4, at step 404, process 400 includes generating different characteristics of the image based on image data including a classification, a segmentation, and an angle with respect to a line in the roadway. For example, map generation system 102 generates different characteristics of the image based on image data including a classification, a segmentation, and an angle with respect to a line in the roadway. As an example, map generation system 102 generates a plurality of different characteristics of the image based on the image data, wherein the plurality of different characteristics includes a classification of one or more elements of the image, a segmentation of the one or more elements of the image, and an angle of the one or more elements of the image with respect to a line in the roadway.

In some non-limiting embodiments or aspects, map generation system 102 generates the plurality of different characteristics based on a machine learning technique (e.g., a pattern recognition technique, a data mining technique, a heuristic technique, a supervised learning technique, an unsupervised learning technique, etc.). For example, map generation system 102 may generate a model (e.g., an estimator, a classifier, a prediction model, etc.) based on a machine learning algorithm (e.g., a decision tree algorithm, a gradient boosted decision tree algorithm, a neural network algorithm, a convolutional neural network algorithm, etc.). In such an example, map generation system 102 may generate the plurality of different characteristics using the prediction model. In some non-limiting embodiments or aspects, a prediction score may include an indication whether the image (e.g., the entire image, a portion of the image, an element of the image, a pixel of the image, etc.) of a geographical area includes and/or is associated with one or more crosswalk locations and/or one or more crossing lanes.

In some non-limiting embodiments or aspects, map generation system 102 generates the plurality of different characteristics based on an encoder-decoder model. In some non-limiting embodiments or aspects, an architecture of an encoder-decoder model can include skip connections and residual layers, such as feature pyramid networks to output the three feature maps (e.g., a residual learning framework to ease training of networks as disclosed by Mattyus, G., Wang, S., Fidler, S., Urtasun, R. in the paper titled "Enhancing road maps by parsing aerial images around the world", (In ICCV, 2015), the entire contents of which is hereby incorporated by reference, a multi-scale, pyramidal hierarchy of a deep convolutional network as disclosed by Mattyus, G., Wang, S., Fidler, S., Urtasun, R. in "HD maps: Fine-grained road segmentation by parsing ground and aerial images", (In CVPR, 2016), the entire contents of which is hereby incorporated by reference, and deep neural network architecture to learn without an increase in the number of parameters as disclosed by Nair, V., Hinton, G. E. in "Rectified linear units improve restricted boltzmann machines", (In Proceedings of the 27th International Conference on International Conference, 2010) the entire contents of which is hereby incorporated by reference).

Figure 6:
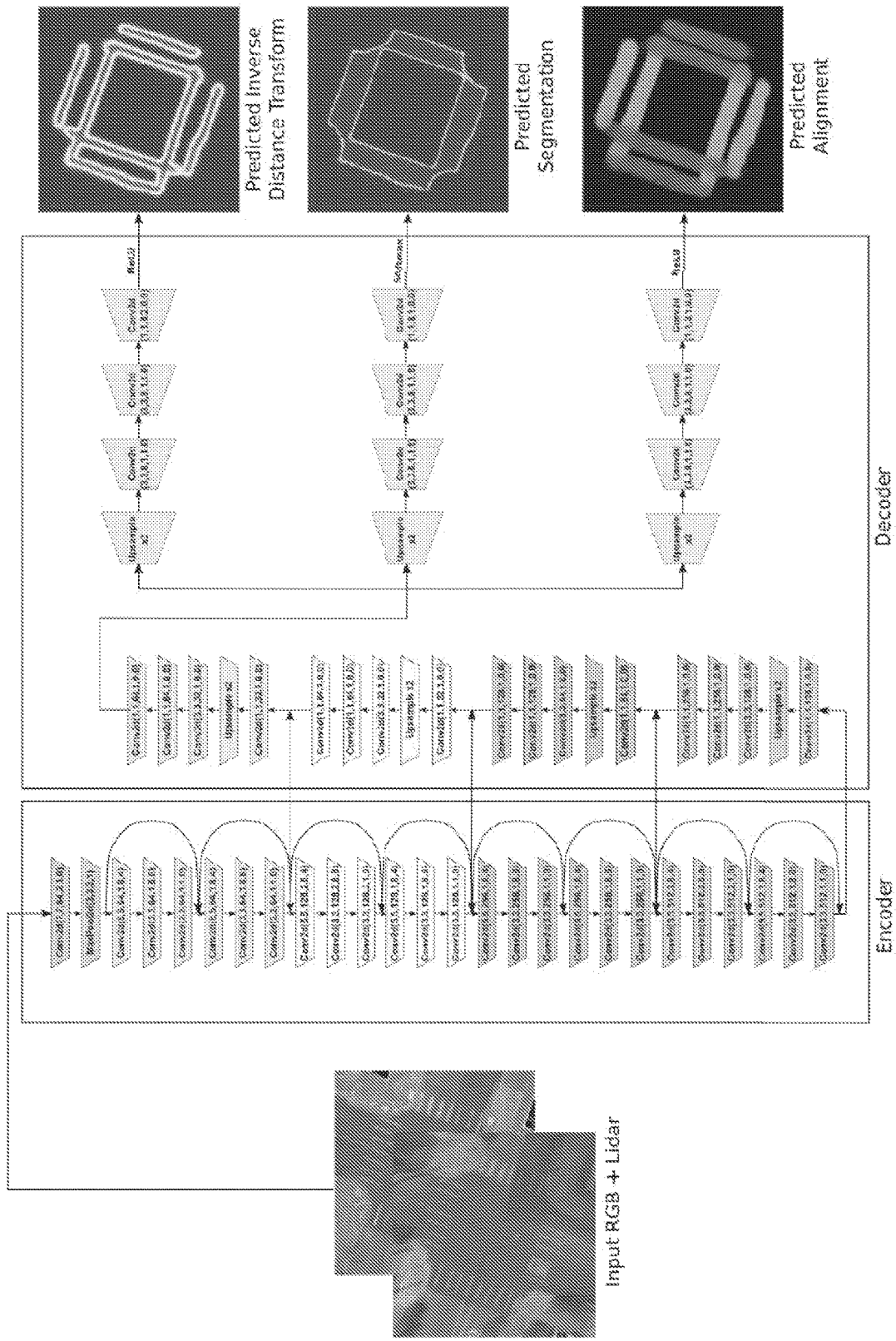
FIG. 6 is a diagram of non-limiting embodiments or aspects of a convolutional neural network for map generation.

Referring now to FIG. 6, FIG. 6 shows an example of a diagram of a network architecture including one or more convolutional layers, and including before each convolutional layer a batch normalization (e.g., a normalizing layer input as disclosed by Visin, F., Ciccone, M., Romero, A., Kastner, K., Cho, K., Bengio, Y., Matteucci, M., Courville, A. in "Reseg: A recurrent neural network-based model for semantic segmentation", (In CVPR, 2016) the entire contents of which is hereby incorporated by reference), followed by a ReLU non-linearity (e.g., a more powerful type of hidden unit by tying the weights and biases of an infinite set of binary units as disclosed in Volodymyr, I., Coughlan, J., Shen, H. in "Detecting and locating crosswalks using a camera phone", (In CVPRW (2008), the entire contents of which is hereby incorporated by reference).

In some non-limiting embodiments or aspects, the CNN includes an encoder network having one or more residual blocks including at least three convolutional layers. In some non-limiting embodiments or aspects, artificial neurons of a first convolutional layer of the CNN are connected only to elements in a scanning window (e.g. receptive window, etc.) of a feature map. For example, the scanning window forms a small square around elements of the feature maps. To ensure the network has a large receptive field (e.g., to handle large images, etc.), map generation system 102 may provide dilated convolutions in the residual blocks (e.g., a dilated convolution operator is particularly suited to dense prediction due to its ability to expand the receptive field without losing resolution or coverage as disclosed by Teo, T. A., Rau, J. Y., Chen, L. C., Liu, J. K., Hsu, W. C. in "Reconstruction of complex buildings using lidar and 2d maps" (In Innovations in 3D Geo Information Systems, 2006), the entire contents of which is hereby incorporated by reference). In some non-limiting embodiments or aspects, map generation system 102 provides nearest neighbor upsampling back to the original image size in the decoder network. In some non-limiting embodiments or aspects, map generation system 102 divides the output into three branches, for example, one for each feature map.

In some non-limiting embodiments or aspects, to predict the inverse distance transform, a ReLU is used to generate non-linearity before generating outputs to restrict an output (e.g., a distance signal, a value, etc.) to a positive value. In some non-limiting embodiments or aspects, map generation system 102 generates a segmentation by applying a SoftMax over the output to generate a probability map. In some non-limiting embodiments or aspects, map generation system 102 generates an angle (e.g., an alignment map, etc.) by applying a ReLU non-linearity to restrict an output (e.g., one or more angles, a value, etc.) to a positive value.

In some non-limiting embodiments or aspects, the prediction model may use MaxPool2d (e.g., kernel width, kernel height, stride, padding) and Conv2d (e.g., kernel width, kernel height, out channels, stride, padding, dilation). For example, map generation system 102 processes artificial neuron data with one or more pooling layers of the convolution neural network model to produce pooling layer data associated with a pooling layer. For example, map generation system 102 may process artificial neuron data with one or more pooling layers of the convolution neural network model to produce pooling layer data associated with a pooling layer. In some cases, the map generation system 102 outputs to the pooling layer artificial neurons in a first set of rows and columns from a previous convolution layer. For example, the map generation system 102 outputs an aggregated value into the pooling layer data. For example, the map generation system 102 may aggregate by determining a max function. In such an example, feature data located in a first set of rows and columns of the convolutional layers may be subsampled into artificial neuron data associated with the artificial neurons of the convolution layer. For example, only the max input value in each receptive area is stored as pooling layer artificial neuron data. In some cases, the map generation system 102 may determine a mean function based on the feature map.

In some non-limiting embodiments or aspects, map generation system 102 may generate a prediction model (e.g., a crosswalk prediction model) based on map data associated with a map of a geographical area that includes a crosswalk and/or a crossing lane. In some implementations, the prediction model may include a model designed to receive, as an input, image data associated with one or more images of one or more geographical areas that include one or more crosswalk locations and/or one or more crosswalk lanes, and provide, as an output, a prediction (e.g., a probability, a binary output, a yes-no output, a score, a prediction score, etc.) as to whether the image (e.g., the entire image, a portion of the image, an element of the image, a pixel of the image, etc.) of a geographical area includes one or more crosswalk locations. In one example, the prediction model may be designed to receive image data associated with an image of a geographical area, and provide an output that predicts whether the image includes one or more crosswalk locations (e.g., labels one or more elements associated with a crosswalk, etc.). In some non-limiting embodiments or aspects, map generation system 102 may store the prediction model (e.g., for later use). In some non-limiting embodiments or aspects, map generation system 102 may store the prediction model in a data structure (e.g., a database, a linked list, a tree, etc.). The data structure may be located within map generation system 102 or exist externally, and possibly remote from, map generation system 102.

In some non-limiting embodiments or aspects, map generation system 102 may process image data to obtain training data for the prediction model. For example, map generation system 102 may process the image data to change the image data into a format that may be analyzed (e.g., by map generation system 102) to generate a prediction model. The image data that is changed may be referred to as training data. In some non-limiting embodiments or aspects, map generation system 102 may process the image data to obtain the training data based on receiving the image data. Additionally, or alternatively, map generation system 102 may process the image data to obtain the training data based on map generation system 102 receiving an indication that map generation system 102 is to process the image data from a user of map generation system 102, such as when map generation system 102 receives an indication to create a prediction model for a portion of an image of a geographical area corresponding to the image data.

In some non-limiting embodiments or aspects, map generation system 102 trains a convolutional neural network by modifying parameters to optimize a loss function of the convolutional neural network that depends on ground truth labels and one or more predictions of the plurality of different characteristics, wherein the loss function comprises a sum of a segmentation loss, an alignment loss, and a boundary loss.

In some non-limiting embodiments or aspects, map generation system 102 may process the image data associated with the image of the roadway including the crosswalk using the trained convolutional neural network, to generate a plurality of images associated with the plurality of different characteristics of the image. For example, map generation system 102 may process the image data by determining an image variable. An image variable may include a metric, associated with a crosswalk location, which may be derived based on the image data. For example, image data may include an image variable that may be analyzed to generate a prediction model. For example, the image variable may include a variable associated with feature data of a feature map. In some non-limiting embodiments or aspects, the image variable may a variable associated with a road edge of a road (e.g., a variable associated with a location of a road edge of a road, a variable associated with a distance of location from a road edge of a road, a variable associated with an indication whether a location is within a road edge of a road, etc.), a variable associated with an intersection of a road with another road, a variable associated with a roadway of a road, a variable associated with a lane of a roadway of a road (e.g., a variable associated with a travel lane of a roadway, a variable associated with a crosswalk lane of a roadway, a variable associated with a turning lane of a roadway, a variable associated with lane markings of a lane, a variable associated with a direction of travel in a lane of a roadway, etc.), a variable associated with one or more objects in proximity to and/or within a road, a variable associated with a sidewalk of a road, and/or the like. Additionally or alternatively, the image variable may include a variable associated with an intensity of a color (e.g., black, white, etc.) in the image of the geographic area. Additionally or alternatively, the image variable may include a variable associated with a top down camera image (e.g., a synthesized Red Green Blue (RGB) image) of a geographic area.

In some non-limiting embodiments or aspects, map generation system 102 may analyze the training data to generate the prediction model. For example, map generation system 102 may use machine learning techniques to analyze the training data to generate the prediction model. In some implementations, generating the prediction model (e.g., based on training data obtained from image data, based on training data obtained from historical image data) may be referred to as training the prediction model. The machine learning techniques may include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or the like. In some non-limiting embodiments or aspects, the prediction model may include a model that is specific to a particular geographical area, particular image data associated with an image of a geographical area, and/or the like. Additionally, or alternatively, the prediction model may be specific to a particular user (e.g., an operator of an autonomous vehicle, an entity that operates an autonomous vehicle, etc.). In some non-limiting embodiments or aspects, map generation system 102 may generate one or more prediction models for one or more operators of one or more autonomous vehicles, a particular group of autonomous vehicles, and/or the like.

In some non-limiting embodiments or aspects, when analyzing the training data, map generation system 102 may identify one or more image variables (e.g., one or more independent image variables) as predictor variables that may be used to make a prediction (e.g., when analyzing the training data). In some non-limiting embodiments or aspects, values of the predictor variables may be input to the prediction model. For example, map generation system 102 may identify a subset (e.g., a proper subset) of image variables as predictor variables that may be used to accurately predict whether an image (e.g., a portion of the image, an element of the image, a pixel of the image, etc.) of a geographical area includes one or more crosswalk locations. In some non-limiting embodiments or aspects, the predictor variables may include one or more of the image variables, as discussed above, that have a significant impact (e.g., an impact satisfying a threshold) on a probability that the image of the geographical area includes one or more crosswalk locations.

In some non-limiting embodiments or aspects, map generation system 102 may validate the prediction model. For example, map generation system 102 may validate the prediction model after map generation system 102 generates the prediction model. In some non-limiting embodiments or aspects, map generation system 102 may validate the prediction model based on a portion of the training data to be used for validation. For example, map generation system 102 may partition the training data into a first portion and a second portion, where the first portion may be used to generate the prediction model, as described above. In this example, the second portion of the training data (e.g., the validation data) may be used to validate the prediction model.

In some non-limiting embodiments or aspects, map generation system 102 may validate the prediction model by providing validation data associated with an image of a geographical area as input to the prediction model, and determining, based on an output of the prediction model, whether the prediction model correctly, or incorrectly, predicted that the image of the geographical area includes one or more crosswalk locations. In some implementations, map generation system 102 may validate the prediction model based on a validation threshold. For example, map generation system 102 may be configured to validate the prediction model when an image of a geographical area is correctly predicted by the prediction model (e.g., when the prediction model correctly predicts 50% of the validation data, 70% of the validation data, a threshold quantity of the validation data, etc.) as including one or more crosswalk locations.

In some non-limiting embodiments or aspects, if map generation system 102 does not validate the prediction model (e.g., when a percentage of validation data does not satisfy the validation threshold), then map generation system 102 may generate additional prediction models.

In some non-limiting embodiments or aspects, once the prediction model has been validated, map generation system 102 may further train the prediction model and/or create new prediction models based on receiving new training data. The new training data may include image data associated with an image of another geographical area).

In some non-limiting embodiments or aspects, map generation system 102 may generate plurality of different characteristics using a model (e.g., a convolutional neural network, an artificial neural network, a boosted decision tree, a gradient boosted decision tree, etc.). In one example, map generation system 102 may receive one or more feature maps that include feature data associated with one or more features of a road. Additionally or alternatively, map generation system 102 may perform a smoothing process on the one or more feature maps based on receiving the one or more feature maps.

In the example above, the map generation system 102 may determine feature data associated with an element of a multi-dimensional matrix of one or more feature maps. In some non-limiting embodiments or aspects, map generation system 102 may determine feature data associated with an element of a first feature map and feature data associated with an element of a second feature map. The location of the element of the first feature map may correspond to the location of the element of the matrix of the second feature map. For example, the coordinate of the element (e.g., the value of the row of the matrix, the value of the column of the matrix) of the first feature map may correspond to the coordinate of the element of the second feature map. In some non-limiting embodiments or aspects, the first feature map may have a size that is the same as or different from the size of the second feature map. In some non-limiting embodiments or aspects, map generation system 102 may determine feature data associated with an element of a feature map upon which a smoothing process has been performed and feature data associated with an element of a feature map upon which a smoothing process has not been performed.

In some non-limiting embodiments or aspects, map generation system 102 may provide the feature data associated with the element of a multi-dimensional matrix of the one or more feature maps as an input to a model. Map generation system 102 may receive the plurality of different characteristics as an output of the decision tree model.

In some non-limiting embodiments or aspects, map generation system 102 may generate a map (e.g., a crosswalk prediction map) based on the plurality of different characteristics. For example, map generation system 102 may generate the crosswalk prediction map based on the plurality of different characteristics generated using the machine learning technique. In some non-limiting embodiments or aspects, map generation system 102 may generate an overlay that includes the plurality of different characteristics associated with one or more elements of the map that was used to determine the plurality of different characteristics. In some non-limiting embodiments or aspects, map generation system 102 may generate the crosswalk prediction map by combining the overlay and the map that was used to determine the plurality of different characteristics. In some non-limiting embodiments or aspects, map generation system 102 may combine the overlay with a map that includes a label (e.g., a label provided by an individual) of a crosswalk location.

In some non-limiting embodiments or aspects, map generation system 102 may apply a post-processing technique (e.g., spatial smoothing, thresholding, clustering, such as detecting connected components, creating convex hulls around a cluster, applying a minimum bounding box, merging areas in proximity to each other, rotating elements of the crosswalk prediction map, applying map constraints to the crosswalk prediction map, etc.) to the crosswalk prediction map.

In some non-limiting embodiments or aspects, map generation system 102 may apply a bilateral filter on a prediction score associated with an element of the crosswalk prediction map to perform spatial smoothing. For example, map generation system 102 may apply the bilateral filter and replace the prediction score of the element with a weighted average of prediction scores associated with elements that are in proximity to the element upon which the bilateral filter was applied. In this way, map generation system 102 may allow easier detection of a crosswalk lane as compared to foregoing to apply a bilateral filter. Map generation system 102 may allow for easier detection of a crosswalk lane since the bilateral filter may preserve sharp edges between a crosswalk lane and other features of a road. In some non-limiting embodiments or aspects, the weighted average may be Gaussian-shaped based on the distance (e.g., the Euclidean distance) between the element upon which the bilateral filter was applied and one or more elements that are in proximity to the element.

In some embodiments, map generation system 102 may convert a prediction score associated with an element of a crosswalk prediction map to an assigned value (e.g., a label) by comparing the prediction score to a threshold value of a prediction score. For example, map generation system 102 may assign a value (e.g., 1 or 0) to the element based on the prediction score associated with the element satisfying the threshold value.

In some non-limiting embodiments or aspects, map generation system 102 outputs (e.g., automatically) image data based on generating the one or more different characteristics of the image based on image data. For example, the map generation system 102 outputs one or more images based on the image data, but the number of images output will be equal to the number of different characteristics of the image generated.

In some non-limiting embodiments or aspects, map generation system 102 generates a plurality of images associated with one or more characteristics of the crosswalk based on the image data. As an example, map generation system 102 outputs an image representing each of the plurality of different characteristics. For example, map generation system 102 outputs one or more images including a classification of one or more elements of the image, a segmentation of the one or more elements of the image, and an angle of the one or more elements of the image with respect to a line in the roadway.

In some non-limiting embodiments or aspects, map generation system 102 outputs a classification of one or more elements of the image. For example, map generation system 102 outputs (e.g. generates, creates, etc.) an image including a classification of the one or more elements of the image that includes a distance map including a plurality of elements associated with at least one of the first boundary and the second boundary, the distance map including at least one distance to the at least one of the first boundary and the second boundary for at least one element of the plurality of elements within a threshold distance of the at least one of the first boundary and the second boundary. As an example, map generation system 102 outputs a classification for an element of the one or more elements associated with a threshold distance relative to at least one of the first boundary and the second boundary. In some non-limiting embodiments or aspects, the distance map may provide an inverse distance transform from the at least one of the first boundary and the second boundary that form an outline (e.g., a contour, etc.) around a crosswalk. In an example, the distance map may be limited by a threshold distance (e.g., limited to a predetermined area, etc.) for a predetermined number of elements (e.g., 30 pixels, 1.2 meters, etc.)

In some non-limiting embodiments or aspects, map generation system 102 outputs (e.g. generates, creates, etc.) a segmentation of one or more elements of the image. As an example, map generation system 102 outputs an element by element foreground and background segmentation (e.g., a pixel-wise segmentation, etc.) of a crosswalk. For example, a foreground and background segmentation includes a segmentation of the one or more elements of the image that includes a map of the crosswalk identifying a plurality of elements inside the one or more boundaries of the crosswalk, and a plurality of elements outside the one or more boundaries of the crosswalk. For example, the segmentation of the one or more elements of the image includes a segmentation image including a plurality of elements inside the first boundary and the second boundary and a plurality of elements outside the first boundary and second boundary.

In some non-limiting embodiments or aspects, map generation system 102 outputs (e.g. generates, creates, etc.) an angle of the one or more elements of the image with respect to a line in the roadway. As an example, map generation system 102 outputs an angle for an element of the one or more elements of the image. For example, map generation system 102 outputs an angle based on one or more angles associated with a position of the one or more elements with respect to the line of the road. In some non-limiting embodiments or aspects, the line includes at least a portion of a centerline of the roadway. In some non-limiting embodiments or aspects, map generation system 102 generates a plurality of angles associated with a position of a plurality of elements. For example, map generation system 102 outputs a dilated representation of a boundary angle including a plurality of elements having an x value and a y value with respect to the line.

In some non-limiting embodiments or aspects, map generation system 102 may use a SoftMax probability function to calculate a probability distribution of the event over different events. The map generation system 102 determines the probabilities with a range (e.g. 0 to 1), and the sum of all the probabilities will be equal to one. The map generation system 102 uses the SoftMax function for multi-classification model it returns the probabilities of each class and the target class will have the high probability. In some cases, map generation system 102 may output a vector of crosswalk classification.

In some non-limiting embodiments or aspects, map generation system 102 trains the convolutional neural network by modifying parameters to minimize a loss over the loss function of the convolutional neural network that depends on the ground truth label and one or more predictions, wherein the loss function comprises a sum of a segmentation loss, an alignment loss, and a boundary loss.

In some non-limiting embodiments or aspects, a boundary loss (e.g., distance transform classification, etc.) and alignment loss (e.g., angle prediction, etc.) are modeled as regression tasks for predicting a value and the segmentation loss as a pixel-wise classification task specifying a category of a pixel of a crosswalk.

In some non-limiting embodiments or aspects, map generation system 102 trains the convolutional neural network, by minimizing a sum of losses over three prediction tasks according to the following Equation (1):

$$l(I) = lseg(I) + l_{dt}(I) + \lambda_\ell l_a(I) \qquad (1)$$

In Equation (1), $\lambda \lambda_\ell$ is a weighting variable for an alignment loss. In an example, $\lambda \lambda_\ell = 100$ as determined through cross-validation.

In some non-limiting embodiments or aspects, a segmentation loss lseg is determined to be binary cross entropy according to the following Equation (2):

$$lseg(I) = \frac{1}{N}\sum_p (\hat{y}_p \log(y_p) + (1 - \hat{y}_p)\log(1 - y_p)) \qquad (2)$$

In Equation (2), N is the number of pixels in the bird's eye view image, $\hat{y}_p$ represents the ground truth pixel p's value and $y_p$ represents a predicted probability of p being a crosswalk.

In some non-limiting embodiments or aspects, a boundary loss $l_{dt}$ is determined by a mean squared loss according to the following Equation (3):

$$l_{dt}(I) = \frac{1}{N}\sum_p \|d_p - \hat{d}_p\|^2 \qquad (3)$$

In Equation (3), $d_p$ is pixel p's value in the inverse distance transform feature map $\phi_{dt}$.

In some non-limiting embodiments or aspects, alignment loss $l_a$ is defined as the mean squared loss according to the following Equation (4):

$$l_a(I) = \frac{1}{N}\sum_p \left\|\mathrm{atan}\left(\frac{v_{p,y}}{v_{p,x}}\right) - \hat{\alpha}_p\right\|^2 \qquad (4)$$

In Equation (4), $v_{p,y}$ and $v_{p,x}$ are the y and x components of the unit vector corresponding to the predicted angle, and $\alpha_{p,gt}$ is the ground truth angle. In an example, output is restricted to be between $(0, \pi)$, as a single cross-walk boundary can be represented with multiple angles.

In some non-limiting embodiments or aspects, map generation system 102 uses an objective function to train a model, that is either a loss function or its negative (e.g., a reward function, a profit function, a utility function, a fitness function, etc.), in which case it is to be maximized. In some non-limiting embodiments or aspects, map generation system 102 uses a combination of objective functions.

As shown in FIG. 4, at step 406, process 400 includes determining a position of the crosswalk based on different characteristics. For example, map generation system 102 determines a position of the crosswalk based on different characteristics. As an example, map generation system 102 determines a position of the crosswalk based on the plurality of different characteristics, wherein the position includes a first boundary and a second boundary of the crosswalk in the roadway.

In some non-limiting embodiments or aspects, map generation system 102 receives the plurality of images associated with one or more characteristics of the crosswalk based on the image data from the convolutional neural network. As an example, map generation system 102 determines the position of the crosswalk based on receiving the plurality of images associated with one or more characteristics of the crosswalk from the convolutional neural network.

In some non-limiting embodiments or aspects, process 400 includes determining a predicted boundary by maximizing a function. As an example, for given output feature maps, $\phi_{seg}$ and $\phi_{dt}$, (e.g., of the segmentation and classification respectively, etc.), an energy maximization formulation, according to the following Equation (5):

$$\max_{x_1, x_2, \beta} \lambda_l \left(\phi_{seg,\ell,\beta}(x_2) - \phi_{seg,\ell,\beta}(x_1)\right) + (1 - \lambda_l)\left(\phi_{dt,\ell,\beta}(x_2) + \phi_{dt,\ell,\beta}(x_1)\right) \qquad (5)$$

In Equation (5), map generation system 102 determines a first boundary and a second boundary by providing the one or more candidate parameters in formulating an energy maximization problem, where potentials encode the agreement between the segmentation and boundary semantic features.

In Equation (5), $\chi_1$ and $\chi_2$ are two predicted points on a centerline that define a crosswalk, $\beta$ is the boundary angle, $\lambda_I$ is the weighting used to balance between the segmentation and semantic edge feature maps, $\ell$ is the road center line. For example, $\phi_{seg}$ is a segmented output feature map including the segmentation of the one or more elements in the image, $\phi_{dt}$ is a classification output feature map including the classification of the one or more elements in the image, $\chi_1$ and $\chi_2$ are points on the line $\ell$ in the roadway, $\beta$ is the one or more angles of the one or more elements of the image with respect to the line $\ell$, and $\lambda_I$ is a weight that balances $\phi_{seg}$ and $\phi_{dt}$.

In some non-limiting embodiments or aspects, an exhaustive search can be computed very efficiently by using non-axis align integral accumulators (e.g., such as a gradient, etc.). In particular the $\phi_{seg}$ can be converted to a 1D integral image along the road centerline which can be used to calculate the number of enclosed crosswalk pixels inside the boundaries defined by $\chi_1$ and $\chi_2$.

In some non-limiting embodiments or aspects, map generation system 102 determines, based on the one or more angles and the image data, a first likelihood of the one or more elements being on the first boundary or the second boundary, a second likelihood of the one or more elements being between the first boundary and the second boundary, and based on the first likelihood and the second likelihood, whether the position of the crosswalk on the roadway includes the one or more elements. In an example, map generation system 102 determines, based on the one or more angles and the image data, a first likelihood of the one or more elements being on the first boundary or the second boundary. In an example, map generation system 102 determines, based on the one or more angles and the image data, a second likelihood of the one or more elements being between the first boundary and the second boundary. In an example, map generation system 102 determines, based on the first likelihood and the second likelihood, whether the position of the crosswalk on the roadway includes the one or more elements.

In some non-limiting embodiments or aspects, boundary values of $\phi_{dt}$ (e.g., of inverse distance transform image, etc.) are at a maximum when they are associated with values on a boundary of a predicted crosswalk as opposed to near or adjacent, and favors a formulation with predicted boundaries that are right on a boundary in the inverse distance transform image. Segmentation values of $\phi_{seg}$ form a segmentation potential used to ensure the two boundaries have a maximum number of crosswalk pixels inside and a maximum number of background pixels outside.

In accordance with Equation (5), map generation system 102 determines a position of the crosswalk based on a higher likelihood of a predicted crosswalk based on a crosswalk having an element (e.g., an element of an image map associated with a crosswalk, a pixel in an image map associated with a crosswalk, etc.) in a boundary based on a classification (e.g., an element of a first boundary, an element in a second boundary, etc.), and/or includes a maximum number of crosswalk elements (e.g., a pixel, a region, etc.) inside a boundary segment and a maximum number of background elements outside a boundary segment of the segmentation of the one or more elements of the image. For example, map generation system 102 determines a position of a crosswalk by balancing $\phi_{seg}$ and $\phi_{dt}$ in relation to an intersection polygon and a centerline (e.g., a mapped roadway, etc.) associated with the crosswalk until an optimal position (e.g., a best position, etc.) of the boundaries $\chi_1$ and $\chi_2$, and an angle are determined for the crosswalk. In some non-limiting embodiments or aspects, map generation system 102 determines an optimal angle for boundaries $\chi_1$ and $\chi_2$, by expanding the angle $\beta$ for the one or more angles of the one or more elements of the image to ensure an optimal number of elements of $\phi_{seg}$ and $\phi_{dt}$ are included in the crosswalk polygon. For example, map generation system 102 may aggregate (e.g., determine an average value, a mode value, etc.) one or more angles taken along boundaries $\chi_1$ and $\chi_2$.

In some non-limiting embodiments or aspects, a map generation system 102 determines a position of a crosswalk by calculating along a centerline of a crosswalk position to maximize $\phi_{seg}$ and $\phi_{dt}$ to form a likelihood of the crosswalk until a maximum number of elements are enclosed in the crosswalk and a boundary includes a maximum number of boundary elements of a crosswalk. In some non-limiting embodiments or aspects, map generation system 102 uses an integral accumulator to determine an exact inference (e.g., nearly exact, etc.). For example, map generation system 102 determines one or more inferences based on a line in the road (e.g., driving path, road centerlines, etc.), an intersection polygon, and a plurality of different characteristics of the image based on the image data (e.g., feature maps, etc.) predicted by a multi-task convolutional network.

In some non-limiting embodiments or aspects, map generation system 102 is programmed or configured to determine one or more inferences by searching for optimal boundaries in the input data. As an example, map generation system 102 is configured to perform a search for points on a centerline that maximize $\phi_{seg}$ and $\phi_{dt}$ before determining an angle that further maximizes the formulation. For example, map generation system 102 determines the one or more inferences associated with a crosswalk to provide a prediction about where a crosswalk is most accurate with respect to $\phi_{seg}$ and $\phi_{dt}$, before determining an angel.

In some non-limiting embodiments or aspects, map generation system 102 selects a candidate angle (e.g., predicts an optimal angle, etc.) from the angle of the one or more elements of the roadway previously generated. As an example, map generation system 102 continues to maximize $\phi_{seg}$ and $\phi_{dt}$ based on a candidate angle. For example, map generation system 102 determines additional angles for drawing a crosswalk based on a candidate angle by expanding the candidate angle (e.g., ±2°, ±5°, etc.) In some non-limiting embodiments or aspects, map generation system 102 determines an angle of a boundary based an aggregation of angles along a centerline or a boundary, such as a mode of a prediction, an average, etc.

With continued reference to FIG. 4, at step 408, process 400 includes providing map data associated with map of roadway including position of crosswalk. For example, map generation system 102 provides map data associated with map of roadway including position of crosswalk. As an example, map generation system 102 provides map data associated with a map of the roadway, wherein the map data includes the position of the crosswalk on the roadway in the map.

In some non-limiting embodiments or aspects, map generation system 102 and/or autonomous vehicle 104 may determine a crosswalk in a roadway based on a predicted position of a crosswalk associated. In some non-limiting embodiments or aspects, map generation system 102 and/or autonomous vehicle 104 may determine that an element of a crosswalk map includes a crosswalk and/or a crossing lane based on an automatically generated crosswalk associated with an element of the crosswalk map.

Predicted Boundary Examples

In some non-limiting embodiments or aspects, a large dataset was collected for a city, such that all crosswalks in the city within an area of 100 km² were used. In total, 9,502 km were driven by autonomous vehicles and/or vehicles to create the dataset. As an example, the dataset included 1,571 training images, 411 validation images, and 607 test images. As a further example, the dataset included 2,559 intersections with 8,526 crosswalks. In such an example, the results include 5,203 training, 1,412 validation, and 1,911 test crosswalks and each image represents an intersection with at least one crosswalk and has a resolution of 4 cm per pixel.

In some non-limiting embodiments or aspects, precision and/or recall provide based metrics. For example, precision provides a true positive which equals a set of predicted crosswalks with a minimal distance smaller than T and TP+FP=|P| and recall provides a true positive which equals the set of ground truth crosswalks with minimal distance smaller than T and TP+FN=|G|. In an example, precision and recall are evaluated at a T of 20 cm, 40 cm, 60 cm, and 80 cm. In a further example, an Intersection over Union ("IOU") may be calculated for the generated crosswalks and the ground truth.

In some non-limiting embodiments or aspects, map generation system 102 trains a model using a batch size of 1. For example, training a model is performed with a learning rate of 1 e-4 and a weight decay of 5e-4 (e.g., a model is optimized as described by Kingma, D. P., Ba, J. in "Adam: A method for stochastic optimization", (In ICLR, 2015), the entire contents of which is hereby incorporated by reference). In an example, a learning rate may decrease by a factor of 10 every 100,000 training iterations. In some non-limiting embodiments or aspects, map generation system 102 performs data augmentation when training by randomly flipping and rotating the images. In some non-limiting embodiments or aspects, a models may be trained for 110 epochs over an entire training set.

Table 1 below provides performance metrics for implementations of a model using various inputs. For example, in some implementations, different models are trained that use camera only, LIDAR only, a combination of both sensors (e.g., sensor modality), and/or the like. In Table 1, the columns N, C, and L identify number of passes (e.g., multi, single, etc.), camera input (e.g., RGB, etc.), and LIDAR input. For example, "Mutt" represents multiple passes over the map for offline mapping and "1" represents a single pass over the map for online mapping. For example, online mapping is performed real-time as an AV or other mapping vehicle is traversing a roadway. As an example, an AV may detect a crosswalk while traversing the crosswalk or traversing in close proximity to the crosswalk. In such an example, an AV may process the image as it passes through a geographic area (e.g., a city, an intersection, etc.) only once and map the crosswalk concurrently. In some implementations, map generation system 102 performs offline mapping to draw a crosswalk. As an example, offline mapping is where one or more AVs or vehicles traverse a roadway a plurality of times (e.g., many times) to acquire image data (e.g., a number of LIDAR and camera sweeps, etc.). For example, after collecting the image data, map generation system 102 aggregates the data (e.g., LIDAR and camera images) to map the crosswalks. In some non-limiting embodiments or aspects, offline mapping may produce better results because a process can be implemented to ensure that every part of a roadway is present (e.g., missing areas/holes in the image data are accounted for, etc.). The first baseline in Table 1, (NN), provides a nearest neighbor algorithm with respect to visual features. The second baseline in Table 1, (Seg), provides the segmentation output from the model trained on multiple passes of a ground camera and LIDAR. In Table 1 results are compared for a single vehicle traversal (e.g., online mapping, etc.) to results using several vehicle traversals to create an input feature map (e.g., offline mapping, etc.). Table 1 shows the results of using multiple passes for offline mapping perform better, with 96.6% (e.g., row 7, precision @ 40 cm). Table 1 shows 91.5% automation can be reached (e.g., row 4, precision @ 40 cm) for online mapping. As further shown in Table 1, performance is better using a combination of both sensors in image data.

TABLE 1

| | | | | Precision at (cm) | | | | Recall at (cm) | | | | |
|---|---|---|---|---|---|---|---|---|---|---|---|---|
| | N | C | L | 20 | 40 | 60 | 80 | 90 | 40 | 60 | 80 | IOU |
| NN | Mult | ✓ | ✓ | 21.4% | 24.8% | 25.2%. | 25.4% | 19.4% | 22.3% | 22.7% | 43.1% | 35.9% |
| Seg | Mult | ✓ | ✓ | 80.1% | 93.1% | 94.5% | 95.0% | 77.1% | 91.9% | 95.2% | 97.1% | 88.7% |
| Ours | 1 | ✓ | — | 78.8% | 91.2% | 93.8% | 94.9% | 78.6% | 90.5% | 92.9% | 93.8% | 86.9% |
| Ours | 1 | — | ✓ | 77.2% | 90.6% | 93.1% | 94.1% | 76.8% | 89.7% | 91.9% | 92.8% | 85.7% |
| Ours | 1 | ✓ | ✓ | 79.8% | 91.5% | 93.6% | 94.6% | 79.9% | 91.3% | 93.2% | 93.9% | 87.1% |
| Ours | Mult | ✓ | — | 83.4% | 94.9% | 96.6% | 97.3% | 83.3% | 94.6% | 96.2% | 96.8% | 90.2% |
| Ours | Mult | — | ✓ | 84.5% | 95.8% | 97.6% | 98.4% | 85.0% | 96.1% | 97.8% | 98.3% | 91.8% |
| Ours | Mult | ✓ | ✓ | 85.6% | 96.6% | 98.1% | 98.8% | 86.1% | 96.8% | 98.2% | 98.7% | 92.4% |
| Human | — | — | — | 88.3% | 99.4% | 99.7% | 99.8% | 87.3% | 98.3% | 98.8% | 98.8% | 95.3% |

Figure 7:
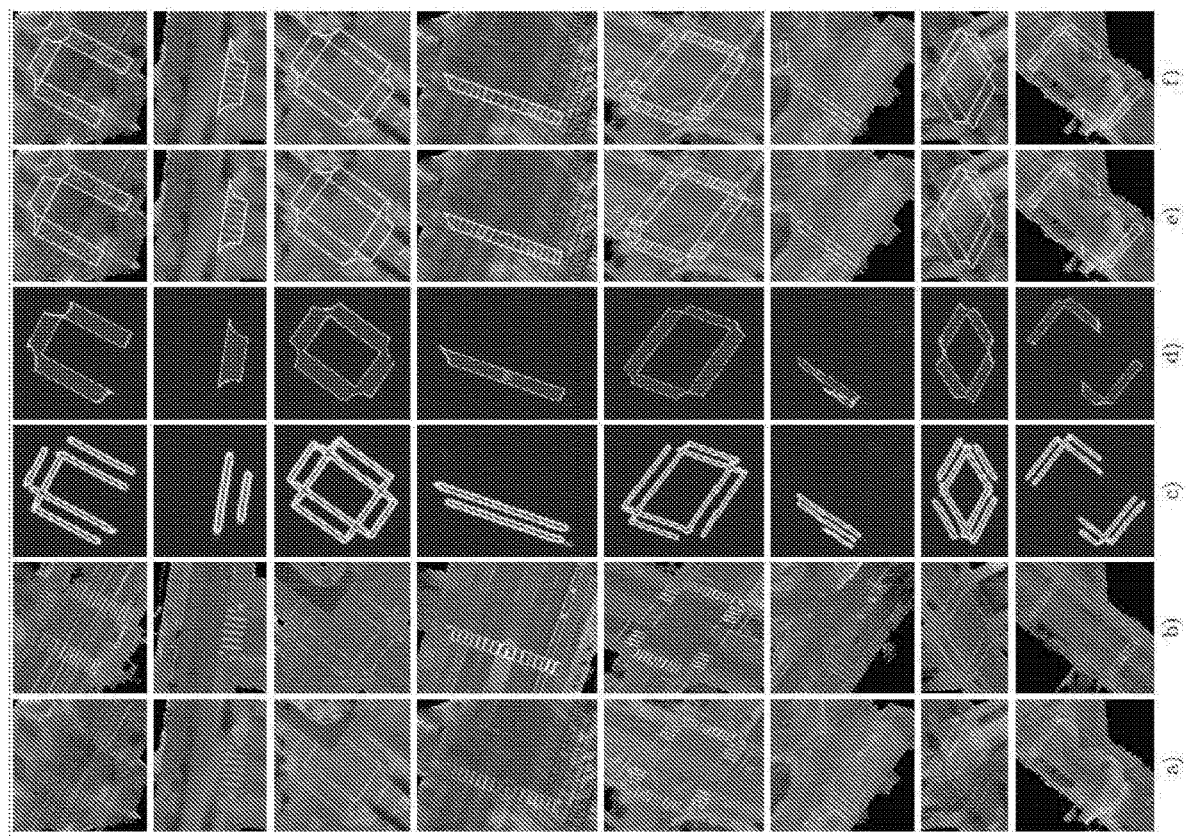
FIG. 7 includes images of non-limiting embodiments or aspects of multiple pass RGB and LIDAR ("RL") crosswalk inputs, network implementation outputs, predicted crosswalk polygons, and ground truth crosswalk polygons.

Referring now to FIG. 7, FIG. 7 shows visualizations of implementation results for a model trained on both camera and LIDAR in an offline map setting. For example, FIG. 7 shows visualizations of offline mapping results performed when a model is trained on both camera and LIDAR imagery, including comparisons between a) ground camera input, b) a ground LIDAR input, c) predicted inverse distance transform, d) predicted segmentation, e) predicted crosswalk polygons after inference, and f) ground truth ("gt") crosswalk polygons.

Figure 8:
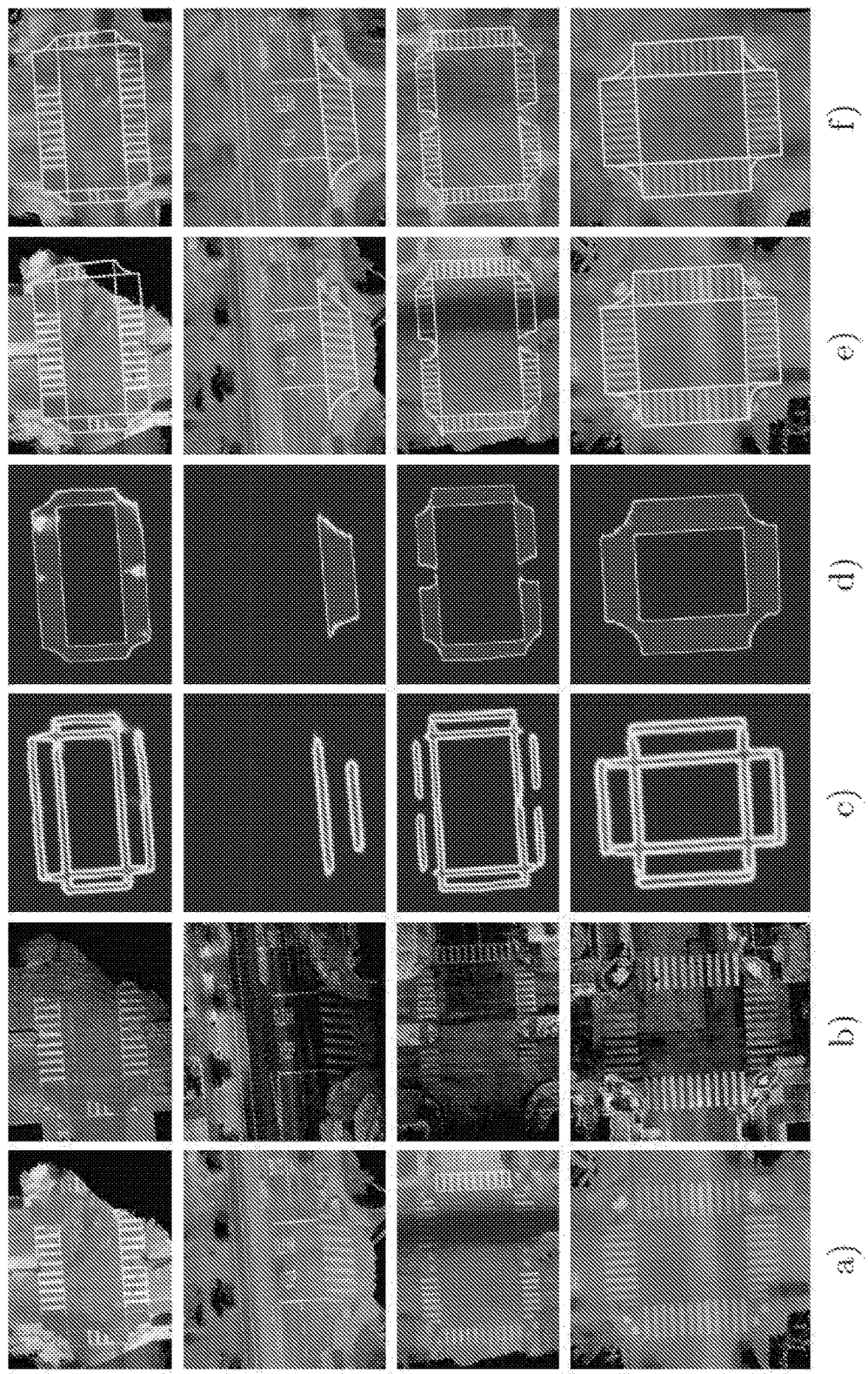
FIG. 8 includes images of non-limiting embodiments or aspects of single pass RL crosswalk inputs, network implementation outputs, predicted crosswalk polygons, and ground truth crosswalk polygons.

Referring now to FIG. 8, FIG. 8 shows visualizations of implementation results for a model trained on an online map setting (e.g., drawing crosswalks with very complex topology in both settings). For example, FIG. 8 shows online mapping results for a model trained on both camera and LIDAR imagery. As shown in FIG. 8, comparisons between col a) ground camera input (online map), b) ground LIDAR input (online map), c) predicted inverse distance transform, d) predicted segmentation, e) predicted crosswalk polygons after inference and f) ground truth crosswalk polygons (e.g., ground truth overlaying a ground camera image (e.g., offline map), etc.).

Still referring to Table 1, the first entry in Table 1 shows results of an implementation using a nearest neighbor algorithm on top of network features extracted from both a camera and LIDAR. For example, Table 1 shows only a 24.8% automation (e.g., precision @ 40 cm) using a nearest neighbor (NN) algorithm as compared to a second entry in Table 1 (Seg) showing results of using only the output of a semantic segmentation image generated by the convolutional neural network (CNN) model for a final prediction. As shown in Table 1, the network performs at up to 93.1% automation (e.g., precision @ 40 cm) in the offline setting using a semantic segmentation only. In an example, Table 1 shows human disagreement in drawing crosswalks (e.g., noise in human annotations, etc.) by comparing implementations of ground truth including annotations of 100 intersections generated with several annotators (e.g., map producers, etc.). As shown in the last row in Table 1, there is about a 4.7% error in IOU, an 11.7% error in the precision, and a 12.7% error in recall at 20 cm between different individuals.

In some non-limiting embodiments or aspects, a CNN provides a forward pass measured at 50 microseconds per image. For example, a determination of a first boundary and a second boundary may be performed in 0.75 s on a single core CPU. FIG. 7 and FIG. 8 are examples showing qualitative results of implementations in a complex topology to accurately determine a crosswalk.

Figure 9:
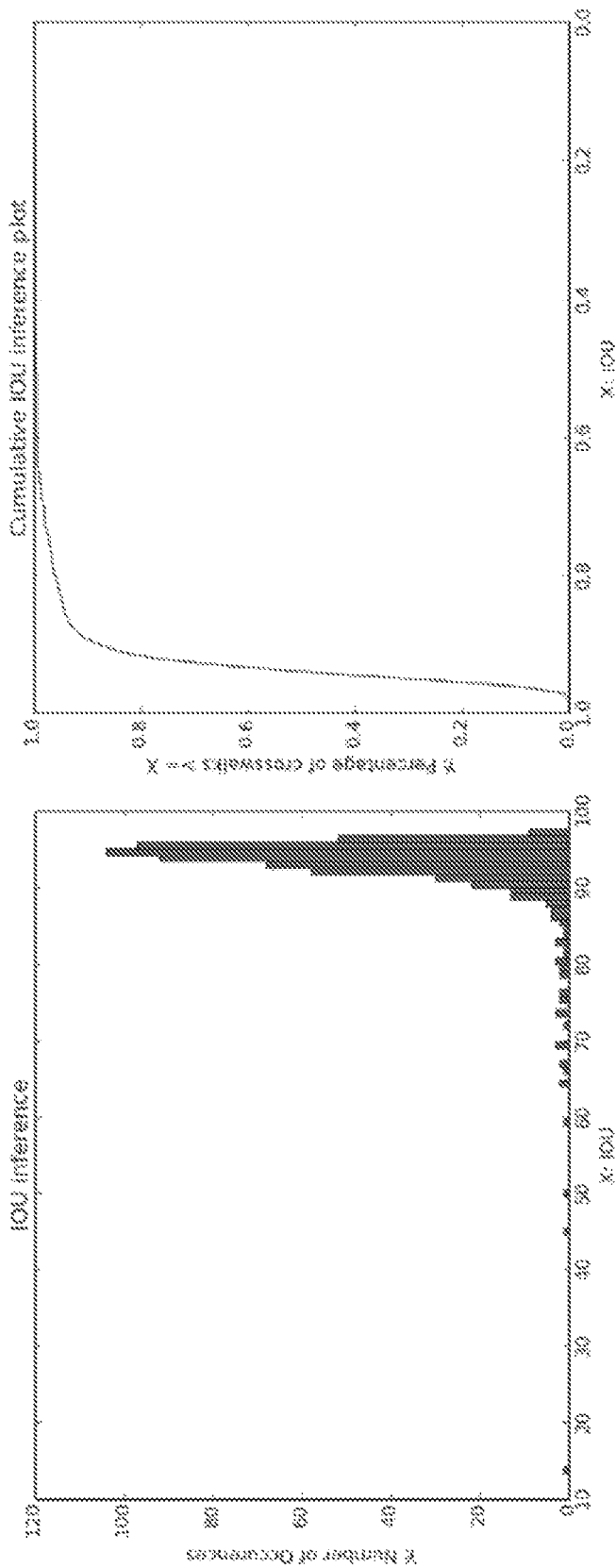
FIG. 9 includes graphs of non-limiting embodiments or aspects of intersection over union ("IOU") associated with multiple pass RL implementations.

Referring now to FIG. 9, FIG. 9 provides a histogram of Intersection over Union ("IOU") results for a model using both LIDAR and camera images as input. For example, FIG. 9 shows a histogram of the IOUs (left) and a cumulative IOU graph (right) using LIDAR and camera images as input. FIG. 9 shows that 94.1% of the crosswalk images have an IOU greater than 85.0%.

Figure 10:
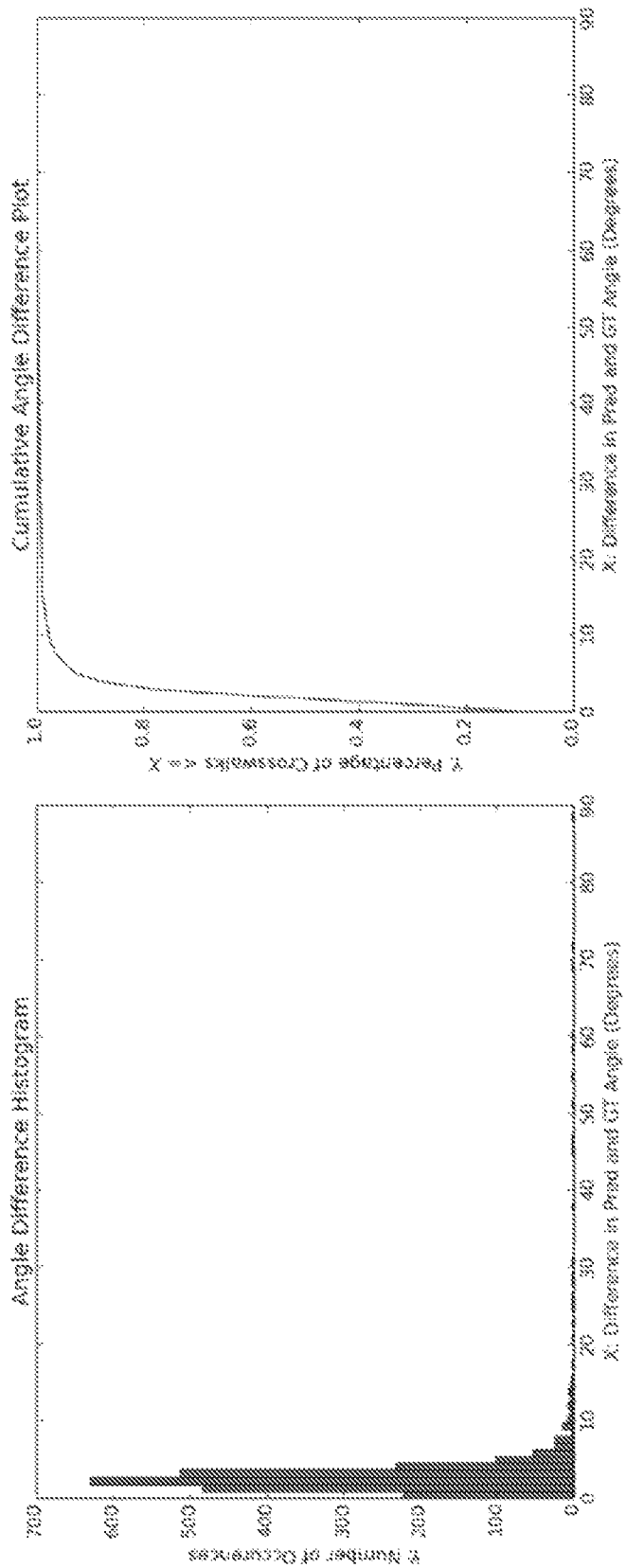
FIG. 10 includes graphs of non-limiting embodiments or aspects of angle prediction associated with single pass RL implementations.

In implementations, determining a correct crosswalk angle may provide high performance cross walk generation (e.g., drawing, etc.). For example, to determine an accuracy of crosswalk angles, an analysis of a combination of a predicted alignment and centerline angle is compared to a ground truth over the same crosswalk to find a difference between an angle used in inference with a ground truth angle. Referring now to FIG. 10, FIG. 10 shows a histogram of angle differences (left) and cumulative angle differences (right) using an offline model trained on both camera and LIDAR. For instance, FIG. 10 shows an example of plotting a histogram and cumulative graph of the differences. In an example, an analysis is provided for a model trained on both the camera and LIDAR imagery from the offline maps. As an example, FIG. 10 provides metrics based on analysis showing that 89% of the crosswalk angles measured are within ±5° from a ground truth. In some implementations, this becomes much higher (e.g., 98%) after a structured prediction step (e.g. after expanding a search to include additional angles, etc.).

Figure 11A:
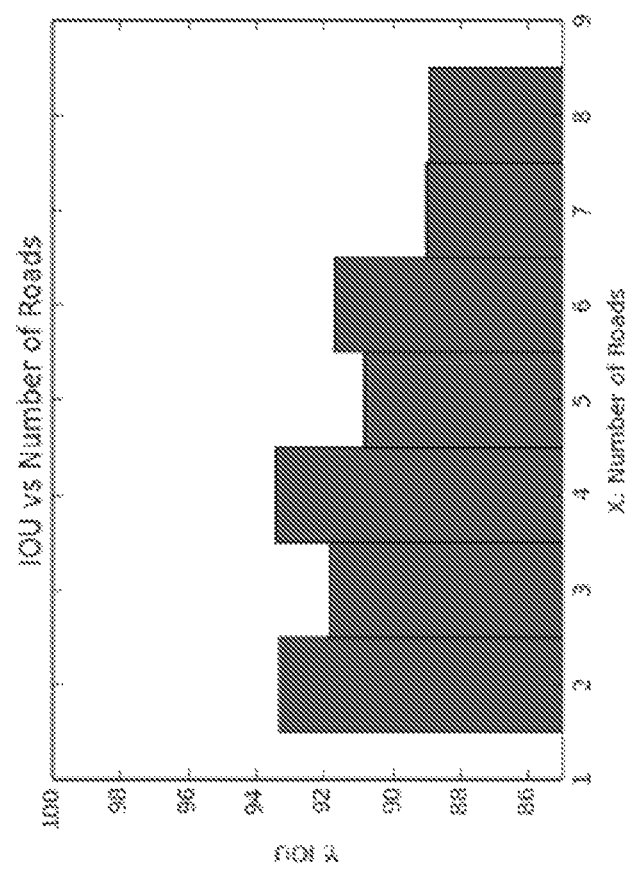
FIGS. 11A-11C are graphs of non-limiting embodiments or aspects of a number of roads associated with implementations.
Figure 11B:
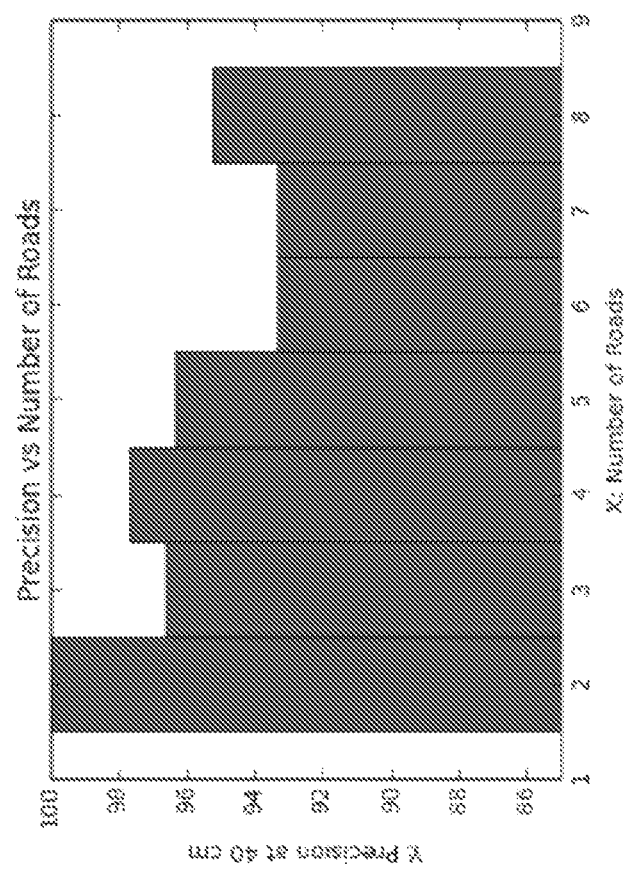
Figure 11C:
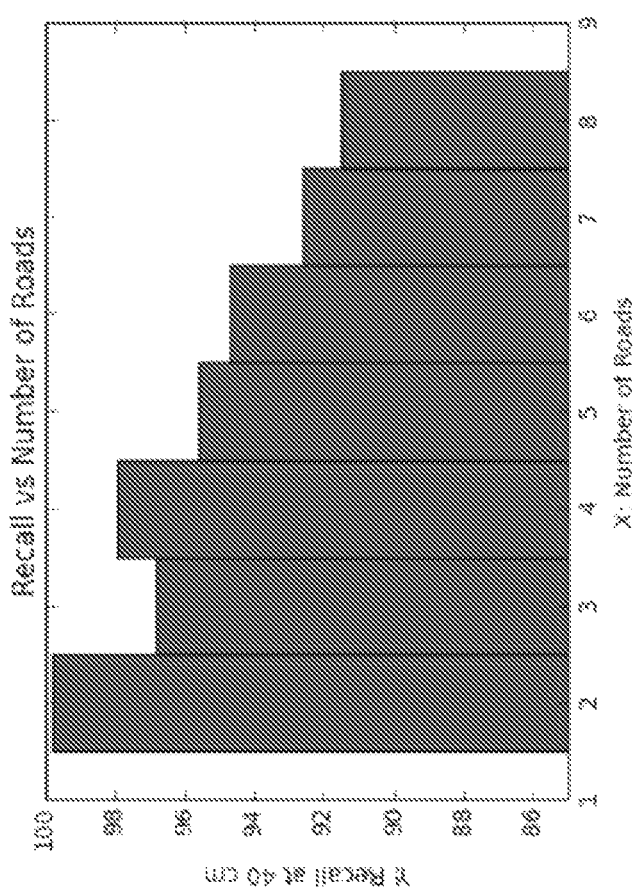

In some non-limiting embodiments or aspects, intersection complexity is analyzed to show an effect of a number of neighboring roads on model results. As an example, a neighboring road is defined as one of one or more roads connecting to an intersection that provides a road centerline for a structured prediction. As an example, if a roadway has a divider in a middle, the roadway is split into 2 roads. In some examples, a 4 way intersection may have 8 roads, such as, for example, 2 roads for each approach to an intersection. Referring now to FIGS. 11A-11C, FIGS. 11A-11C show for implementations, as a number of roads increases (e.g., for intersections that are more complex, etc.), performance decreases. As shown in FIGS. 11A-11C, a visualization of an effect on a number of neighboring roads is provided based on results of a model trained on offline maps using both camera and LIDAR. For example, FIG. 11A provides a histogram of Intersection over Union ("IOU") compared to a number of neighboring roads, FIG. 11B provides precision at 40 cm compared to a number of neighboring roads, and FIG. 11C provides recall at 40 cm. as compared to a number of neighboring roads.

Table 2 below provides results of an ablation study for implementations to analyze the contributions of different components in our model in the context of offline mapping with cameras and LIDAR. Table 2 shows an implementation for ablation and performance using oracle information. For example, an ablation study can be performed to analyze an effect of an angle search, road centerline angles, and predicted angles in rows. In an implementation, for oracle information ground truth distance transform, segmentation and angles are provided to analyze results in rows 5-8. For example, Table 2 shows an effect of removing certain components of the model. For example, in implementations of Table 2, results are shown when an angle search of ±2° and ±5° is removed in row 2 and the usage of the centerline angle is removed in row 3. For example, Table 2 shows a result of a slight decrease in performance. In Table 2, row 4 a predicted angle is not used when drawing crosswalks, showing a significant drop of more than 10% for all the performance metrics.

In implementations, oracle information is used to analyze an upper bound performance of a model. In Table 2, by comparing rows 5, 6 and 7, it is shown that having ground truth segmentation significantly increases the performance of the model. Alternatively, Table 2 shows having ground truth distance transforms only slightly increases the performance. In an example, Table 2 shows that performance using a ground truth angle was only slightly worse than the result in row 1 due to the accuracy of the predicted angles. Table 2 shows that without ground truth angles the model can already achieve 98% angle accuracy. As a further example, Table 2 shows examples of having an alignment prediction correlating to considerably good inference results.

TABLE 2

|  | Precision at (cm) | | | | Recall at (cm) | | | | |
| --- | --- | --- | --- | --- | --- | --- | --- | --- | --- |
|  | 20 | 40 | 60 | 80 | 90 | 40 | 60 | 80 | IOU |
| Ours | 85.6% | 96.6% | 98.1% | 98.8% | 86.1% | 96.8% | 98.2% | 98.7% | 92.4% |
| No Aug Search | 82.2% | 94.4% | 97.1% | 98.1% | 82.7% | 94.7% | 97.2% | 98.2% | 91.3% |
| No Cent Ang | 84.5% | 96.3% | 98.1% | 98.8% | 84.9% | 96.4% | 98.0% | 98.6% | 92.1% |
| No Pred Aug | 74.0% | 85.3% | 88.9% | 91.4% | 73.8% | 84.8% | 88.3% | 90.5% | 83.7% |
| GT DT | 88.5% | 96.6% | 97.8% | 98.3% | 89.5% | 97.3% | 98.4% | 98.8% | 92.9% |
| GT Seg | 94.1% | 97.8% | 98.7% | 99.2% | 94.7% | 98.1% | 98.8% | 99.1% | 94.9% |
| GT Aug | 85.5% | 96.5% | 98.1% | 98.7% | 85.7% | 96.4% | 97.9% | 98.4% | 92.2% |
| GT DT + S + A | 93.9% | 97.5% | 98.5% | 99.0% | 94.9% | 98.1% | 98.9% | 99.2% | 94.9% |

Figure 12:
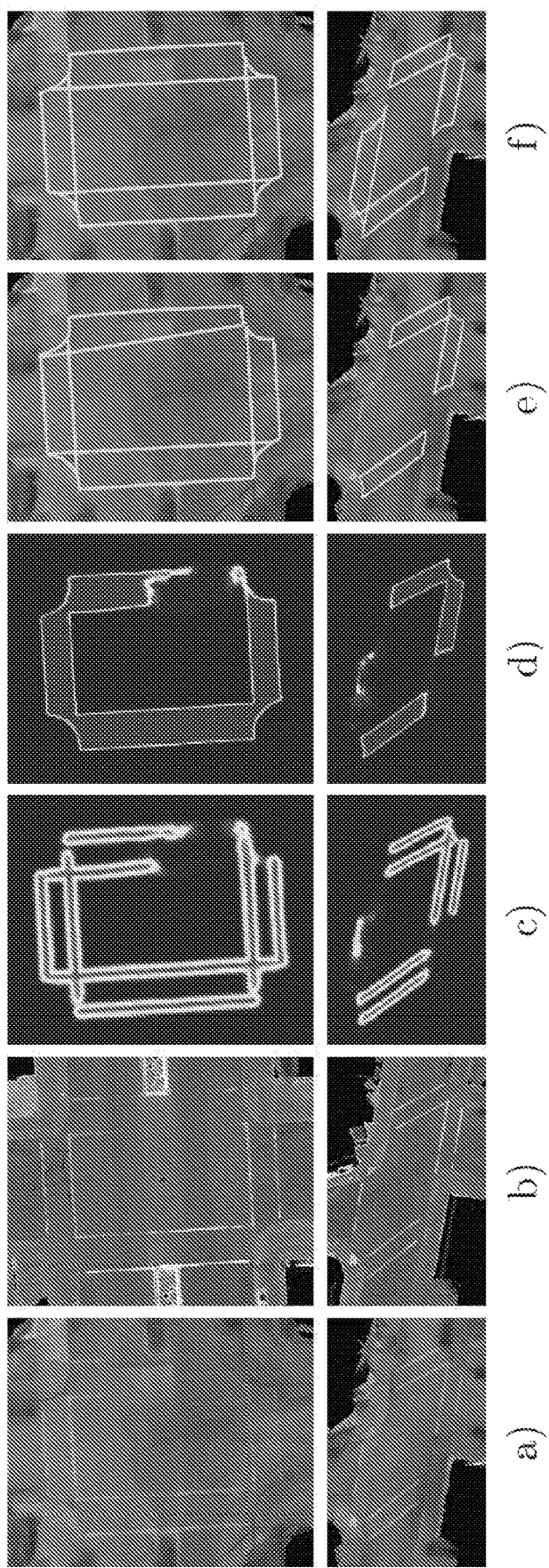
FIG. 12 includes images of non-limiting embodiments or aspects of failure modes in comparisons of crosswalk inputs, network implementation outputs, predicted crosswalk polygons, and ground truth crosswalk polygons.

In some non-limiting embodiments or aspects, map generation system 102 uses a weight $\lambda_f$ to weigh between maximizing segmentation or distance transform energies in an energy formulation. For example, referring now to FIG. 12, FIG. 12 shows a main failure mode caused by balancing characteristics between a segmentation and distance transform weights (top) and poor image/paint quality (bottom). As shown in FIG. 12, comparisons are provided between a) ground camera input, b) ground LIDAR input, c) predicted inverse distance transform, d) predicted segmentation, e) predicted crosswalk polygons after inference, and f) ground truth crosswalk polygons.

As shown in FIG. 12 in the top image, since almost half of the crosswalk boundary in the right crosswalk is missing, an implementation of the model predicts the wrong segmentation. In this case, the implementation of the model shows that predicting a boundary focusing on a segmentation energy provides a larger value and may produce an incorrect inference. In a further example shown in FIG. 12, a second failure mode is shown in a bottom image, having a poor paint quality in ground imagery (although not shown, this is also true for the LIDAR imagery). Thus, in some implementations a model may mistake a crosswalk (e.g., a boundary line, etc.) for a stop line at an intersection, and may not predict its presence for the segmentation output.

Figure 13:
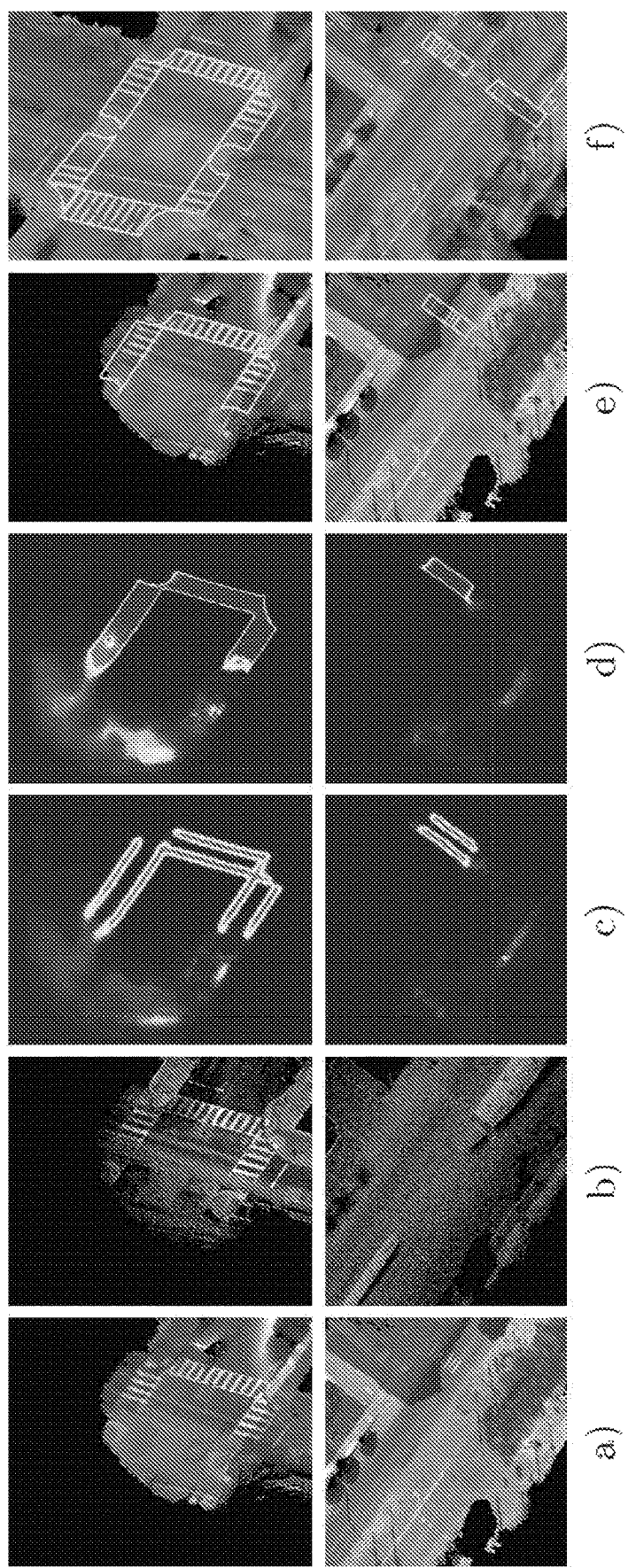
FIG. 13 includes images of non-limiting embodiments or aspects of balancing between segmentation and distance transform weights and poor image/paint quality in comparisons of crosswalk inputs, network implementation outputs, predicted crosswalk polygons, and ground truth crosswalk polygons.

Referring now to FIG. 13, FIG. 13 shows failure modes of an online mapping implementation. As an example, FIG. 13 shows comparisons between a) ground camera input (e.g., online map), b) ground LIDAR input (e.g., online map), c) predicted inverse distance transform, d) predicted segmentation, e) predicted crosswalk polygons after inference and f) ground truth crosswalk polygons overlaid on the ground camera (e.g., offline map). For example, failure modes are shown as holes in the map. In an example, a main failure mode for an online model is caused by poor data collection when mapping a roadway that may be associated with holes and/or poor image quality as shown in FIG. 13.

Figure 14:
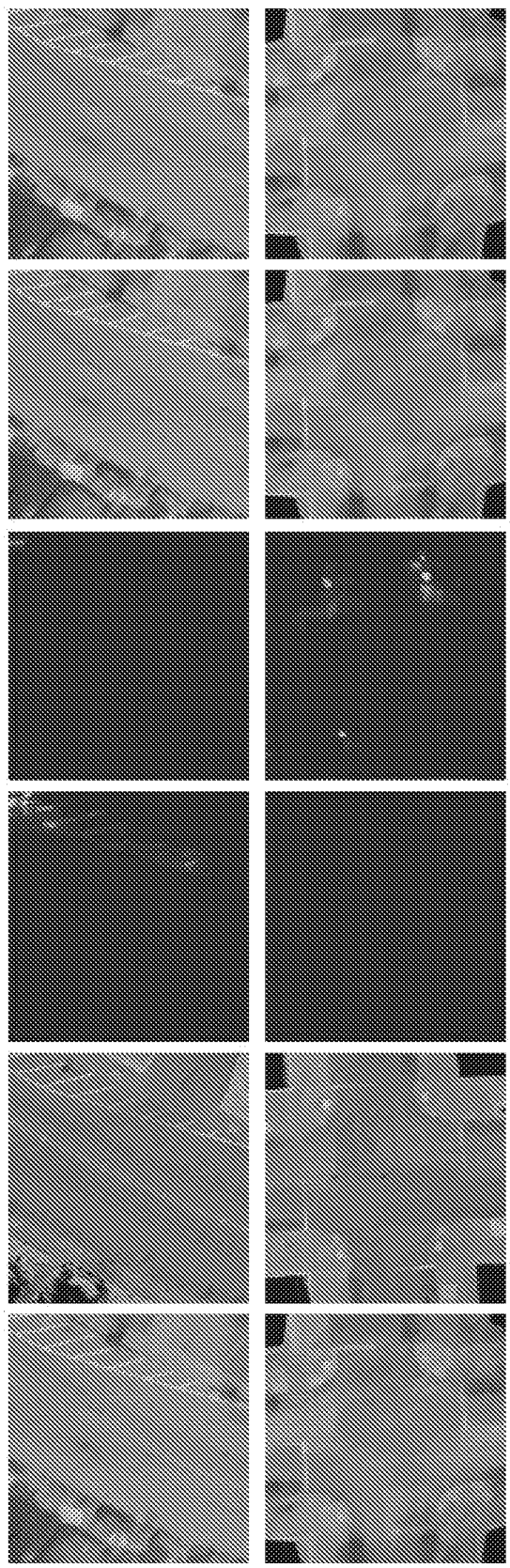
FIG. 14 includes images of non-limiting embodiments or aspects of comparisons of crosswalk inputs, network implementation outputs, predicted crosswalk polygons, and ground truth crosswalk polygons of online model crosswalks having failure modes.

In some non-limiting embodiments or aspects, an implementation of a model trained with only crosswalks (e.g., not trained with images of intersections without crosswalks presented, etc.) produces 5.7% false positives. In some non-limiting embodiments or aspects, a model retrained with images that do not contain crosswalks (e.g., 45% added images of intersections without crosswalks, etc.), a false positive rate is 0.04%, similar to a performance result from Table 1 row 8. For example, referring now to FIG. 14, FIG. 14 shows examples of results for a model retrained with images where a crosswalk is missing. As an example, FIG. 14 shows comparisons between a) ground camera input, b) ground LIDAR input, c) predicted inverse distance transform, d) predicted segmentation, e) predicted crosswalk polygons, f) ground truth polygons.

Figure 15:
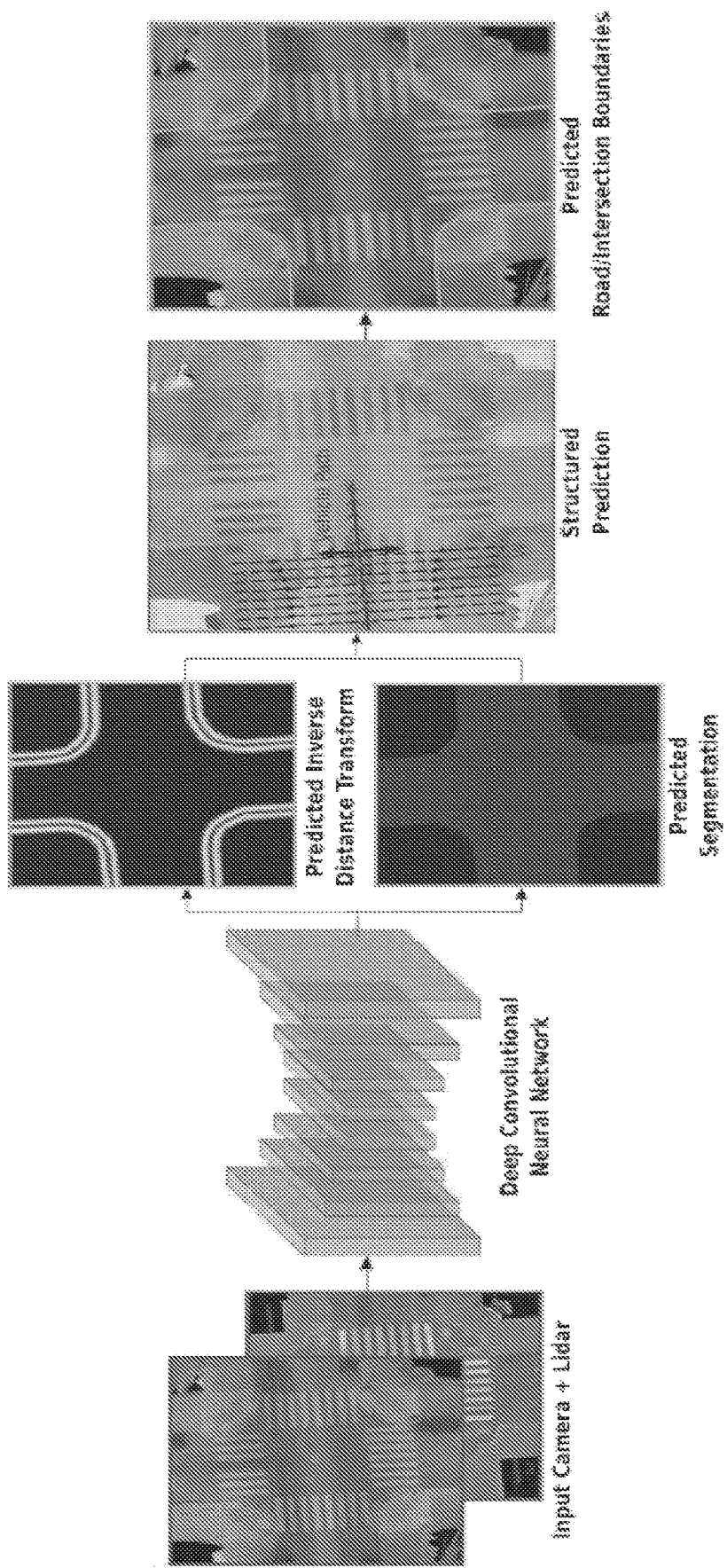
FIG. 15 is a diagram of non-limiting embodiments or aspects of a crosswalk generation model.

In some non-limiting embodiments or aspects, map generation system 102 may generate stop lines if only a first boundary is predicted instead of two boundaries. In some non-limiting embodiments or aspects, map generation system 102 may determine a road/intersection boundary prediction. For example, referring now to FIG. 15, FIG. 15 shows an implementation of a model where a method can be applied to determine a road/intersection boundary prediction. In such an implementation, a model outputs both an inverse distance transform and predicted segmentation, and uses a driving path, all mover priors, and/or the like at one or more intervals to perform a search perpendicular to the vehicle path for a left and right point of a boundary. For example, a left and right point of a boundary can be further extended to draw a lane (e.g., a road edge, a drivable surface boundary, etc.).

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computing system comprising:

one or more processors programmed to perform operations comprising:

obtaining image data, the image data comprising: a plurality of image elements showing a roadway that includes a crosswalk; centerline data indicating a position of a centerline of the roadway; and an intersection polygon indicating a position of an intersection on the roadway;

generating a segmentation feature map using the image data, the segmentation feature map comprising a first portion of the plurality of image elements within a first boundary and a second portion of the plurality of image elements within a second boundary;

generating a classification feature map using the image data, the classification feature map describing a first distance between a first element of the plurality of image elements and the first boundary and a second distance between the first element of the plurality of image elements and the second boundary;

determining a position for the first boundary and a position for the second boundary using the segmentation feature map, the classification feature map, the centerline on the roadway, and the intersection polygon; and providing map data associated with a map of the roadway, wherein the map data includes a position of the crosswalk on the roadway in the map, the position of the crosswalk indicated at least in part by the position for the first boundary and the position for the second boundary.

2. The computing system of claim 1, wherein determining of the position for the first boundary and the position for the second boundary comprises applying a weight to at least one of the segmentation feature map or the classification feature map.

3. The computing system of claim 1, the operations further comprising determining a first angle relating the first element of plurality of image elements to the centerline of the roadway, the determining of the position for the first boundary and the position of the second boundary based at least in part on the first angle.

4. The computing system of claim 3, the operations further comprising:
  determining, using the first angle and the image data, a first likelihood that the first element of the plurality of image elements is either on the first boundary or on the second boundary;
  determining, using the first angle and the image data, a second likelihood that the first element of the plurality of image elements is between the first boundary and the second boundary; and
  determining, using the first likelihood and the second likelihood, a first element value indicating whether the first element is part of the crosswalk, the determining of the position for the first boundary and the position for the second boundary based at least in part on the first element value.

5. The computing system of claim 3, the determining of the first angle further comprising determining a dilated representation of a boundary angle including an x-value and a y-value with respect to the centerline of the roadway.

6. The computing system of claim 1, the operations further comprising:
  training, by the computing system, a computerized model to optimize a loss function of the computerized model, the loss function comprising a sum of a segmentation loss, an alignment loss, and a boundary loss; and
  generating, by the computing system and using the image data, a plurality of images, each of the plurality of images being associated with at least one of a plurality of characteristics of the image data, the determining of the position for the first boundary and the position for the second boundary being based at least in part on the plurality of images.

7. The computing system of claim 6, the segmentation loss being based at least in part on a comparison between a first probability that the first element depicts a crosswalk and a ground truth probability that any given element of the plurality of image elements depicts a crosswalk.

8. The computing system of claim 6, the operations further comprising determining a first angle relating the first element of plurality of image elements to the centerline of the roadway, the alignment loss being based on comparing the first angle to a ground truth angle.

9. The computing system of claim 6, the boundary loss being based on an inverse distance transform of the classification feature map.

10. A computer-implemented method for generating a map of a geographic area indicating crosswalks in the geographic area, the method comprising:
  obtaining, by a computing system, image data by a computing system comprising one or more processors, the image data comprising: a plurality of image elements showing a roadway that includes a crosswalk; centerline data indicating a position of a centerline of the roadway; and an intersection polygon indicating a position of an intersection on the roadway;
  generating, by the computing system, a segmentation feature map using the image data, the segmentation feature map comprising a first portion of the plurality of image elements within a first boundary and a second portion of the plurality of image elements within a second boundary;
  generating, by the computing system, a classification feature map using the image data, the classification feature map having a first distance between a first element of the plurality of image elements and the first boundary and a second distance between the first element of the plurality of image elements and the second boundary;
  determining, by the computing system, an position for the first boundary and an position for the second boundary using the segmentation feature map, the classification feature map, the centerline on the roadway, and the intersection polygon; and
  providing, by the computing system, map data associated with a map of the roadway, wherein the map data includes the position of the crosswalk on the roadway in the map, the position of the crosswalk indicated at least in part by the position for the first boundary and the position for the second boundary.

11. The method of claim 10, the determining of the position for the first boundary and the position for the second boundary comprising balancing the segmentation feature map and the classification feature map in relation to the centerline on the roadway and the intersection polygon.

12. The computer-implemented method of claim 10, further comprising determining a first angle relating the first element of plurality of image elements to the centerline of the roadway, the determining of the position for the first boundary and the position of the second boundary based at least in part on the first angle.

13. The computer-implemented method of claim 12, further comprising:
  determining, using the first angle and the image data, a first likelihood that the first element of the plurality of image elements is either on the first boundary or on the second boundary;
  determining, using the first angle and the image data, a second likelihood that the first element of the plurality of image elements is between the first boundary and the second boundary; and
  determining, using the first likelihood and the second likelihood, a first element value indicating whether the first element is part of the crosswalk, the determining of the position for the first boundary and the position for the second boundary based at least in part on the first element value.

14. The computer-implemented method of claim 12, the determining of the first angle further comprising determining a dilated representation of a boundary angle including an x-value and a y-value with respect to the centerline of the roadway.

15. The computer-implemented method of claim 10, further comprising:
  training, by the computing system, a computerized model to optimize a loss function of the computerized model, the loss function comprising a sum of a segmentation loss, an alignment loss, and a boundary loss; and
  generating, by the computing system and using the image data, a plurality of images, each of the plurality of images being associated with at least one of a plurality of characteristics of the image data, the determining of the position for the first boundary and the position for the second boundary being based at least in part on the plurality of images.

16. The computer-implemented method of claim 15, the segmentation loss being based at least in part on a comparison between a first probability that the first element depicts a crosswalk and a ground truth probability that any given element of the plurality of image elements depicts a crosswalk.

17. The computer-implemented method of claim 15, further comprising determining a first angle relating the first element of plurality of image elements to the centerline of the roadway, the alignment loss being based on comparing the first angle to a ground truth angle.

18. The computer-implemented method of claim 15, the boundary loss being based on an inverse distance transform of the classification feature map.

19. At least one non-transitory computer-readable medium including program instructions that, when executed by at least one processor, cause the at least one processor to execute operations comprising:
- obtaining image data by a computing system comprising one or more processors, the image data comprising: a plurality of image elements showing a roadway that includes a crosswalk; centerline data indicating a position of a centerline of the roadway; and an intersection polygon indicating a position of an intersection on the roadway;
- generating a segmentation feature map using the image data, the segmentation feature map comprising a first portion of the plurality of image elements within a first boundary and a second portion of the plurality of image elements within a second boundary;
- generating a classification feature map using the image data, the classification feature map having a first distance between a first element of the plurality of image elements and the first boundary and a second distance between the first element of the plurality of image elements and the second boundary;
- determining an position for the first boundary and an position for the second boundary using the segmentation feature map, the classification feature map, the centerline on the roadway, and the intersection polygon; and
- providing map data associated with a map of the roadway, wherein the map data includes the position of the crosswalk on the roadway in the map, the position of the crosswalk indicated at least in part by the position for the first boundary and the position for the second boundary.

20. The at least one non-transitory computer-readable medium of claim 19, the determining of the position for the first boundary and the position for the second boundary comprising balancing the segmentation feature map and the classification feature map in relation to the centerline on the roadway and the intersection polygon.

* * * * *